US010655952B2

(12) United States Patent
Wakita

(10) Patent No.: US 10,655,952 B2
(45) Date of Patent: *May 19, 2020

(54) VISUALIZER, MEASUREMENT SYSTEM, AND MEASUREMENT METHOD

(71) Applicant: Panasonic Intellectual Property Management Co., Ltd., Osaka (JP)

(72) Inventor: Naohide Wakita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

This patent is subject to a terminal disclaimer.

(21) Appl. No.: 15/782,464

(22) Filed: Oct. 12, 2017

(65) Prior Publication Data

US 2018/0058841 A1 Mar. 1, 2018

Related U.S. Application Data

(63) Continuation of application No. PCT/JP2017/008885, filed on Mar. 7, 2017.

(30) Foreign Application Priority Data

Jun. 14, 2016 (JP) ................................. 2016-118192

(51) Int. Cl.
*G01B 11/14* (2006.01)
*G01K 11/00* (2006.01)
(Continued)

(52) U.S. Cl.
CPC ............... *G01B 11/14* (2013.01); *G01C 9/06* (2013.01); *G01C 9/12* (2013.01); *G01C 9/18* (2013.01);
(Continued)

(58) Field of Classification Search
CPC . G01B 11/14; G01C 9/06; G01C 9/12; G01C 9/18; G01D 5/285; G01D 5/30;
(Continued)

(56) References Cited

U.S. PATENT DOCUMENTS 3,617,131 A 11/1971 Taguchi
3,708,231 A * 1/1973 Walters .................... G01C 9/04
356/152.1

(Continued)

FOREIGN PATENT DOCUMENTS

CN 1384343 A 12/2002
DE 3307966 A1 9/1984
(Continued)

OTHER PUBLICATIONS

International Search Report of PCT application No. PCT/JP2017/008885 dated May 30, 2017.

(Continued)

*Primary Examiner* — James T Boylan
(74) *Attorney, Agent, or Firm* — McDermott Will & Emery LLP

(57) ABSTRACT

A state visualizer according to one aspect of the present disclosure includes an optical member including a fixed part that has a fixed relative positional relationship with an object to be measured and a movable part that is movably supported by the fixed part and keeps a constant angle with respect to a gravity direction, the optical member retroreflecting a light or an electromagnetic wave in a case where the fixed part and the movable part are in a predetermined positional relationship. The optical member changes an intensity of the light or the electromagnetic wave reflected in a retroreflection direction in accordance with a change of a relative positional relationship between the fixed part and the movable part.

12 Claims, 20 Drawing Sheets

(51) Int. Cl.

| | | |
|---|---|---|
| *G01C 9/12* | (2006.01) | |
| *G01D 5/30* | (2006.01) | |
| *G01D 5/28* | (2006.01) | |
| *G01C 9/06* | (2006.01) | |
| *G01C 9/18* | (2006.01) | |
| *G01K 5/62* | (2006.01) | |
| *G06T 7/73* | (2017.01) | |
| *G01N 13/02* | (2006.01) | |
| *G01N 27/30* | (2006.01) | |
| *G01S 13/89* | (2006.01) | |
| *G02B 5/122* | (2006.01) | |
| *G02B 5/132* | (2006.01) | |
| *H04N 5/225* | (2006.01) | |
| *H04N 7/18* | (2006.01) | |
| *G01S 13/90* | (2006.01) | |
| *G01S 13/75* | (2006.01) | |

(52) U.S. Cl.
CPC .............. *G01D 5/285* (2013.01); *G01D 5/30* (2013.01); *G01K 5/62* (2013.01); *G01K 11/00* (2013.01); *G01N 13/02* (2013.01); *G01N 27/302* (2013.01); *G01S 13/89* (2013.01); *G02B 5/122* (2013.01); *G02B 5/132* (2013.01); *G06T 7/74* (2017.01); *H04N 5/2256* (2013.01); *H04N 7/181* (2013.01); *G01S 13/75* (2013.01); *G01S 13/90* (2013.01)

(58) Field of Classification Search
CPC .......... G01K 11/00; G01K 5/62; G01N 13/02; G01N 27/302; G01S 13/75; G01S 13/89; G01S 13/90; G02B 5/122; G02B 5/132; G06T 7/74; H04N 5/2256; H04N 7/181
USPC ........................................................ 348/135
See application file for complete search history.

(56) References Cited

U.S. PATENT DOCUMENTS

| | | | |
|---|---|---|---|
| 5,289,434 A | 2/1994 | Berni | |
| 5,705,810 A * | 1/1998 | Wang ..................... | G01B 11/16 250/231.1 |
| 5,956,355 A | 9/1999 | Swanson et al. | |
| 6,160,826 A | 12/2000 | Swanson et al. | |
| 6,221,496 B1 | 4/2001 | Mori | |
| 7,101,053 B2 | 9/2006 | Parker | |
| 8,405,636 B2 | 3/2013 | Bridger | |
| 2002/0150399 A1* | 10/2002 | Ishikawa .............. | G02B 7/1822 396/432 |
| 2008/0062433 A1* | 3/2008 | Phipps .................. | G01B 11/26 356/521 |
| 2009/0161217 A1 | 6/2009 | Mimura | |
| 2012/0033710 A1* | 2/2012 | Kim ........................ | G01K 5/62 374/161 |
| 2017/0356792 A1 | 12/2017 | Wakita | |
| 2018/0058841 A1 | 3/2018 | Wakita | |

FOREIGN PATENT DOCUMENTS

| | | | | |
|---|---|---|---|---|
| DE | 19826565 A1 * | 6/1999 | ............. | G01H 9/006 |
| GB | 1147473 A | 4/1969 | | |
| GB | 2159940 A | 12/1985 | | |
| JP | 54-010255 U | 1/1979 | | |
| JP | 54010255 U * | 1/1979 | | |
| JP | 55-178104 U | 12/1980 | | |
| JP | 61-052238 U | 4/1986 | | |
| JP | 62-101229 | 5/1987 | | |
| JP | 2-057015 U * | 4/1990 | | |
| JP | 2-198324 | 8/1990 | | |
| JP | 6-030995 U | 4/1993 | | |
| JP | H10-153701 A | 6/1998 | | |
| JP | 2000-002533 | 1/2000 | | |
| JP | 2000-002533 | * 7/2000 | | |
| JP | 2005-283440 | 10/2005 | | |
| JP | 2006-058202 | 3/2006 | | |
| JP | 2007-130398 | 5/2007 | | |
| JP | 2008-281422 A | 11/2008 | | |
| JP | 2010-045730 A | 2/2010 | | |
| JP | 2012-103009 A | 5/2012 | | |
| JP | 2013-047674 | 3/2013 | | |
| WO | 2007064033 A1 | 6/2007 | | |
| WO | 2015012094 A1 | 1/2015 | | |

OTHER PUBLICATIONS

Akio Hada et al., "Build a sensor network for status monitoring", RRR, vol. 70, No. 11, Nov. 2013, pp. 22-25.
The Extended European Search Report dated Sep. 18, 2019 for the related European Patent Application No. 17783381.1.
The partial supplementary European search report (R.164 EPC) dated May 24, 2019 for the related European Patent Application No. 17783381.1.
The Extended European Search Report issued in related European Patent Application No. 16782753.4, dated Mar. 21, 2018.
International Search Report of International Application No. PCT/JP2016/001288 dated May 31, 2016, with English translation.
Kohei Makino et al., "Structural Identification of Existing Bridges by Vibration Measurements Using Laser Doppler Velocimeter", Journal of the Japanese Society for Experimental Mechanics, vol. 11, No. 3, pp. 201-208, Sep. 2011.
Notice of Allowance issued in corresponding U.S. Appl. No. 15/659,095, dated Mar. 25, 2019.
Non-Final Office Action issued in corresponding U.S. Appl. No. 15/659,095, dated Oct. 18, 2018.

* cited by examiner

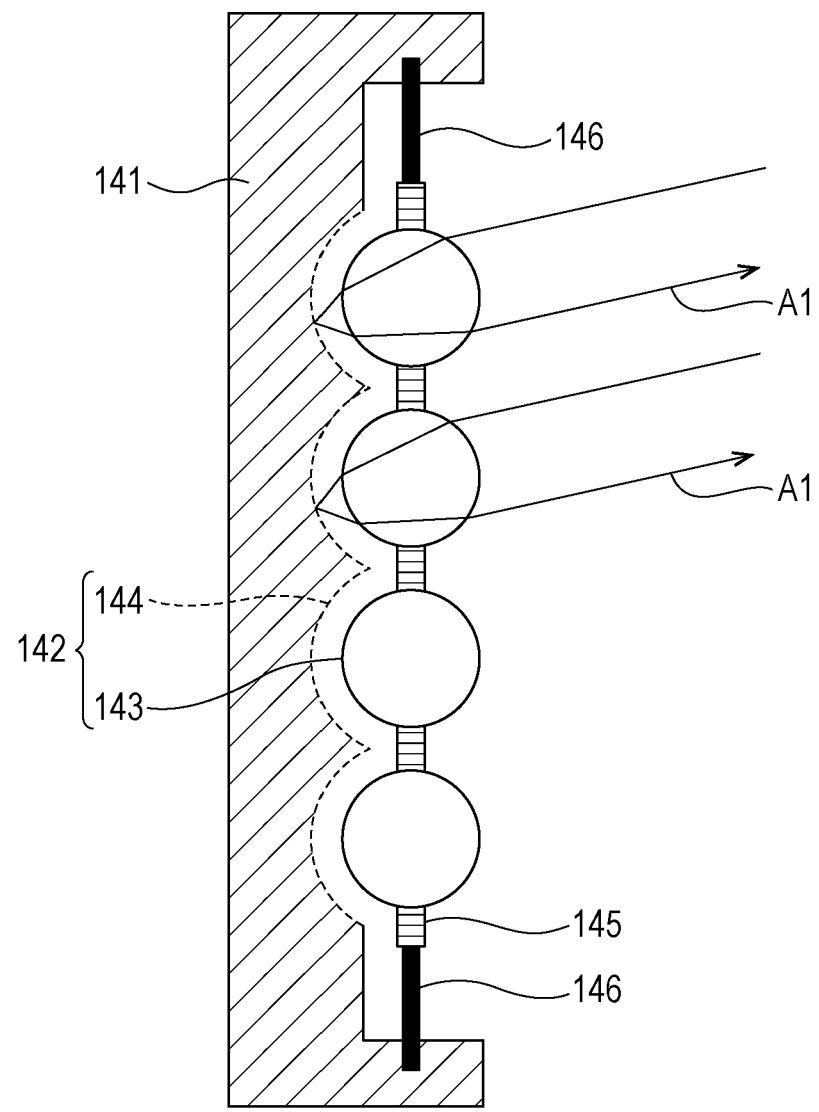

VISUALIZER, MEASUREMENT SYSTEM, AND MEASUREMENT METHOD

BACKGROUND

1. Technical Field

The present disclosure relates to a visualizer that is attached to an object to be measured, and a measurement system and a measurement method using the visualizer.

2. Description of the Related Art

In recent years, the concept of Internet of Things (IoT) that enables various objects to be connected to the Internet by using a sensor and the like attached to these objects, and analysis and use of big data that is a collection of a wide variety and a large volume of data have been attracting attention. Especially in the fields such as infrastructure, civil engineering, and plant, techniques for monitoring a tilt angle, vibration, temperature, humidity, an amount of moisture, and the like of an object to be measured such as a bridge, a tunnel, a machine, or ground over a sensor network have been vigorously developed.

In Japan, a lot of public structures such as bridges and tunnels were constructed during the high-growth period of the Japanese economy (in the 1970's), and it is expected that the number of structures that outlive their usefulness rapidly increase in the future. In view of the circumstance, in recent years, research and development of techniques for automatically inspecting an infrastructure by using a sensor in order to keep an increase in cost of maintenance of the infrastructure small and prevent accidents have been conducted.

For example, the University of Illinois has developed a system for analyzing vibration and the like on the basis of data transmitted from a large number of wireless sensor nodes that include sensors such as an acceleration sensor and a temperature sensor, a CPU, and a wireless unit and that are attached to an object to be measured (Illinois Structural Health Monitoring Project).

Furthermore, research and development of techniques for measuring a tilt angle, natural vibration, an amount of moisture, and the like of ground by using a wireless sensor have been conducted in order to prevent disasters such as a sediment disaster caused by abnormal weather such as a localized torrential rain that is seen more frequently than before in recent years.

RRR, Vol. 70, No. 11, November 2013, pp. 22-25, "Jyotai Kanshi No Tameno Sensor Network Wo Kouchiku Suru (Construction of Sensor Network for State Monitoring)" describes a sensor network that monitors a state of a railway by using a clinometer, a displacement meter, and the like.

SUMMARY

One non-limiting and exemplary embodiment provides a visualizer that makes it possible to visualize a state of an object to be measured.

In one general aspect, the techniques disclosed here feature a visualizer including an optical member including a fixed part that has a fixed relative positional relationship with an object to be measured and a movable part that is movably supported by the fixed part and keeps a constant angle with respect to a gravity direction, the optical member retroreflecting a light or an electromagnetic wave in a case where the fixed part and the movable part are in a predetermined positional relationship, wherein the optical member changes an intensity of the light or the electromagnetic wave reflected in a retroreflection direction in accordance with a change of a relative positional relationship between the fixed part and the movable part.

A visualizer according to an aspect of the present disclosure makes it possible to visualize a state of an object to be measured.

It should be noted that general or specific aspects may be implemented as an element, a device, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 19A is a cross-sectional view of a visualizer included in a measurement system according to Fourth Embodiment of the present disclosure and illustrates the visualizer in a case where a state of an object to be measured has not changed.

DETAILED DESCRIPTION

Figure 1:
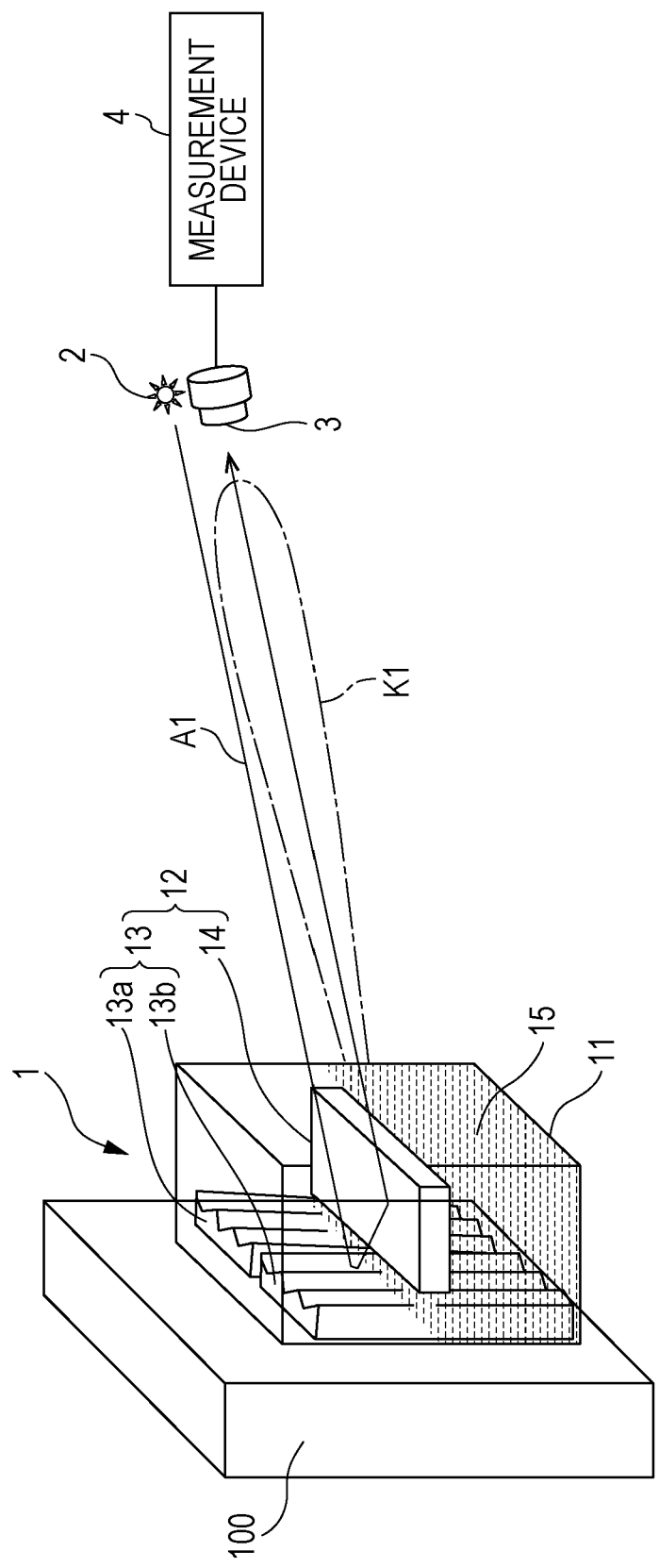
FIG. 1 illustrates an outline configuration of a measurement system according to First Embodiment of the present disclosure.

Underlying Knowledge Forming Basis of the Present Disclosure

The present disclosure relates to a visualizer that makes it possible to visualize a tilt angle, vibration, temperature, humidity, an amount of moisture, and the like of an object to be measured such as a bridge, a tunnel, a machine, or ground and to a measurement system and a measurement method using the visualizer.

According to a measurement method using wireless sensor nodes, it is possible to concurrently measure an entire object to be measured by attaching a plurality of wireless sensor nodes all around the object to be measured. However, according to this measurement method, electric power consumption of electric components such as a sensor, a CPU, and a wireless unit that are provided in each of the wireless sensor nodes is large, and it is therefore necessary to frequently change batteries.

Since monitoring of a state of an infrastructure, a natural environment, or the like is often done under a harsh environment such as a dangerous place (e.g., a high place) or an inconvenient place, it is not easy to change batteries and it is therefore required to keep the number of times of maintenance as small as possible.

Meanwhile, in a case where each of the wireless sensor nodes is made up of electric components that consume small electric power, it is possible to lessen the frequency of battery change. In this case, however, it is necessary to install a lot of relay units, and cost for installation of the relay units is high. Furthermore, it is necessary to change batteries of the relay units. Furthermore, electric components are easy to corrode and therefore have a short lifetime.

As an example of a measurement method that does not use a sensor, a measurement method using a laser Doppler velocimeter. The laser Doppler velocimeter uses a Doppler effect. Specifically, laser is emitted from the meter toward an object to be measured, and speed of the object to be measured relative to the meter is measured on the basis of a change of a wavelength of a wave reflected by the object to be measured. Use of this laser Doppler velocimeter makes it possible to visualize and measure, for example, vibration added to the object to be measured. However, according to the measurement method using a laser Doppler velocimeter, only a single position can be measured at one time, and it takes a considerable time to measure a state of the whole of the object to be measured.

Besides the measurement method using a laser Doppler velocimeter, there are other measurement methods using laser. However, each of these measurement methods is a method for measuring slight displacement of an object to be measured by using coherence or directivity of laser light. It is therefore difficult to perform accurate measurement under disturbance such as wind or rain. Furthermore, an expensive device is needed.

In view of the circumstances, the inventor of the present invention found as a result of diligent studies that these problems can be improved by using an optical member having light or electromagnetic wave retroreflection characteristics and configuring the optical member so that part of the optical member is displaced in accordance with a change of a state of an object to be measured. Based on this finding, the inventor of the present invention accomplished the following invention.

Item 1

A visualizer including an optical member including a fixed part that has a fixed relative positional relationship with an object to be measured and a movable part that is movably supported by the fixed part and keeps a constant angle with respect to a gravity direction, the optical member retroreflecting a light or an electromagnetic wave in a case where the fixed part and the movable part are in a predetermined positional relationship, wherein the optical member changes an intensity of the light or the electromagnetic wave reflected in a retroreflection direction in accordance with a change of a relative positional relationship between the fixed part and the movable part.

Item 2

The visualizer according to Item 1, wherein the optical member includes a first mirror having a first mirror surface, a second mirror having a second mirror surface, and a third mirror having a third mirror surface, the first mirror surface, the second mirror surface, and the third mirror surface intersecting and facing one another;

the first mirror is included in the fixed part, the second mirror is included in the movable part and is supported by the fixed part so that the second mirror surface keeps a constant angle with respect to the gravity direction; and the optical member changes the intensity of the light or the electromagnetic wave reflected in the retroreflection direction in accordance with a change of an angle formed between the first mirror surface and the second mirror surface, the optical member includes a first mirror, a second mirror, and a third mirror Item 3

The visualizer according to Item 1 or 2, wherein the optical member includes a liquid that is held by the fixed part, and the movable part is supported by the fixed part through the liquid.

Item 4

The visualizer according to Item 3, wherein a specific gravity of the liquid is larger than a specific gravity of the movable part.

Item 5

The visualizer according to Item 1 or 2, wherein the fixed part has a protruding part; and the movable part is supported by the fixed part at the protruding part serving as a supporting point.

Item 6

The visualizer according to Item 1 or 2, wherein the optical member includes a string that has a first end connected to the fixed part and a second end connected to the movable part, and the movable part is supported by the fixed part through the string.

Item 7

A visualizer including an optical member including a fixed part that has a fixed relative positional relationship with an object to be measured and a movable part that is movably supported by the fixed part and changes a relative positional relationship with the fixed part in accordance with a physical amount, the optical member retroreflecting a light or an electromagnetic wave in a case where the fixed part and the movable part are in a predetermined positional relationship, wherein the optical member changes an intensity of the light or the electromagnetic wave reflected in a retroreflection direction in accordance with a change of a relative positional relationship between the fixed part and the movable part.

Item 8

The visualizer according to Item 7, wherein the optical member includes a support member through which the movable part is supported by the fixed part, and the relative positional relationship between the fixed part and the movable part changes by deformation or displacement of the support member, the deformation or the displacement being generated in accordance with a change of the predetermined physical amount.

Item 9

The visualizer according to Item 8, wherein the optical member includes a spherical lens and a concave reflection member located behind the spherical lens, one of the spherical lens and the concave reflection member is included in the fixed part, the other of the spherical lens and the concave reflection member is included in the movable part; and the other of the spherical lens and the concave reflection member is supported by the fixed part through the support member.

Item 10

The visualizer according to Item 8, wherein the optical member includes spherical lenses that are linked to each other and concave reflection members, each of the concave reflection members being located behind corresponding one of the spherical lenses;

one of (i) the spherical lenses and (ii) the concave reflection members is included in the fixed part, and the other of (i) the spherical lenses and (ii) the concave reflection members is included in the movable part; and the other of (i) the spherical lenses and (ii) the concave reflection members is supported by the fixed part through the support member.

Item 11

The visualizer according to any one of Items 8 through 10, wherein the support member includes a bimetal; and the relative positional relationship between the fixed part and the movable part changes by deformation or displacement of the bimetal, the deformation or the displacement being generated in accordance with a physical amount detected by a detection device.

Item 12

The visualizer according to Item 11, wherein the bimetal is deformed in accordance with a change of at least one of temperature, humidity, an amount of moisture, a far-infrared ray, and radiation.

Item 13

The visualizer according to Item 8, further including a stress part that applies stress corresponding to a physical amount detected by a detection device to the support member, wherein the relative positional relationship between the fixed part and the movable part changes by deformation or displacement of the support member, the deformation or the displacement being generated by the stress.

Item 14

The visualizer according to Item 13, wherein the stress unit includes a tensiometer; and the support member is deformed or displaced by pressure generated by the tensiometer in accordance with an amount of moisture of the object to be measured.

Item 15

The visualizer according to Item 13, wherein the stress part includes a pH meter that includes two kinds of metal electrodes having different ionization tendencies; and the pH meter deforms or displaces the support member by electromagnetic force or electrostatic force, the electromagnetic force or the electrostatic force being generated by an electric potential difference between the metal electrodes that is generated in accordance with pH of the object to be measured.

Item 16

A measurement system including:

one or more visualizers according to claim 1;

a lighting device that emits a light or an electromagnetic wave toward the one or more visualizers mounted on an object to be measured;

an imaging device that takes an image including the object to be measured and the one or more visualizers; and a measurement device that measures a change of a relative positional relationship between the fixed part and the movable part in the one or more visualizers on a basis of a change of an intensity of reflected light or a reflected electromagnetic wave from the one or more visualizers in the image.

Item 17

The measurement system according to Item 16, wherein the imaging device includes a plurality of cameras or a compound-eye camera; and the measurement device detects a light distribution of the reflected light or the reflected electromagnetic wave on a basis of a plurality of images taken by the plurality of cameras or the compound-eye camera.

Item 18

The measurement system according to Item 16 or 17, wherein the lighting device includes a plurality of light sources; and the plurality of light sources emit light beams or electromagnetic waves that are different from one another in terms of at least one of a wavelength, a polarization state, and an irradiation timing.

Item 19

A measurement method including:

emitting light or an electromagnetic wave to one or more visualizers according to Claim 1 attached to an object to be measured;

taking an image including a reflected light or a reflected electromagnetic wave from the one or more visualizers; and measuring a state of the object to be measured on a basis of the image.

Embodiments of the present disclosure are described below with reference to the drawings. The present disclosure is not limited by these embodiments. Identical or similar constituent elements are given identical reference signs, and description thereof is sometimes omitted.

First Embodiment

FIG. 1 is illustrates an outline configuration of a state measurement system according to First Embodiment of the present disclosure. The measurement system according to First Embodiment includes a visualizer 1, a lighting device 2, an imaging device 3, and a measurement device 4.

The visualizer 1 is attached to an object to be measured 100 such as a bridge or a tunnel. The visualizer 1 visualizes a tilt angle and a dynamic change of the tilt angle of the object to be measured 100 with respect to a vertical direction (also called a gravity direction). In First Embodiment, for simplification of description, it is assumed that the object to be measured 100 is a rectangular parallelepiped and one side thereof is parallel with the vertical direction.

The lighting device 2 is a device that emits light or an electromagnetic wave toward the visualizer 1. The lighting device 2 may be a light source that does not generate much flicker, for example, a device such as a DC (direct current)-driven LED. The lighting device 2 need not be a special lighting device, as long as the lighting device 2 has an irradiation angle appropriate for irradiation of the object to be measured 100 and brightness that depends on an object distance and an environment. Examples of the lighting device 2 include an LED light, an HID light, a halogen light, and a mercury light. For example, the lighting device 2 includes a light source such as a white LED and an emission optical system and emits light from an emission opening of the emission optical system.

The imaging device 3 is a device that takes an image including a reflected light or a reflected electromagnetic wave that is reflected in a retroreflection direction by the optical member 12, as illustrated in FIG. 1. In First Embodiment, the imaging device 3 is disposed close to the lighting device 2. The imaging device 3 can be, for example, a camera or a radar. The imaging device 3 may be, for example, a digital video camera that includes a CMOS or a CCD and an incident-side lens. In this case, a distance between a center of the incident-side lens of the imaging device 3 and a center of the emission opening of the lighting device 2 may be 1 m or less or may be 50 cm or less. The imaging device 3 and the lighting device 2 may be fixedly coupled to each other so that a positional relationship between the imaging device 3 and the lighting device 2 does not change during shooting. This allows stable shooting and measurement by retroreflection characteristics of the visualizer 1 that will be described later even in a case where the imaging device 3 is mounted on a movable body or shakes due to disturbance such as wind.

The measurement device 4 is a device that measures a state of the object to be measured 100 on the basis of an image taken by the imaging device 3. In First Embodiment, the measurement device 4 measures a tilt angle of the object to be measured 100 on the basis of an image taken by the imaging device 3. The measurement device 4 also has a function of controlling the lighting device 2. The measurement device 4 can be realized, for example, by a personal computer and software installed in the personal computer. The measurement device 4 may include, for example, a memory in which software and image data are stored, a processor, and a display.

Next, the configuration of the visualizer 1 is described in more detail. The visualizer 1 includes a transparent housing 11 and the optical member 12 that has light or electromagnetic wave retroreflection characteristics, as illustrated in FIG. 1.

Figure 2:
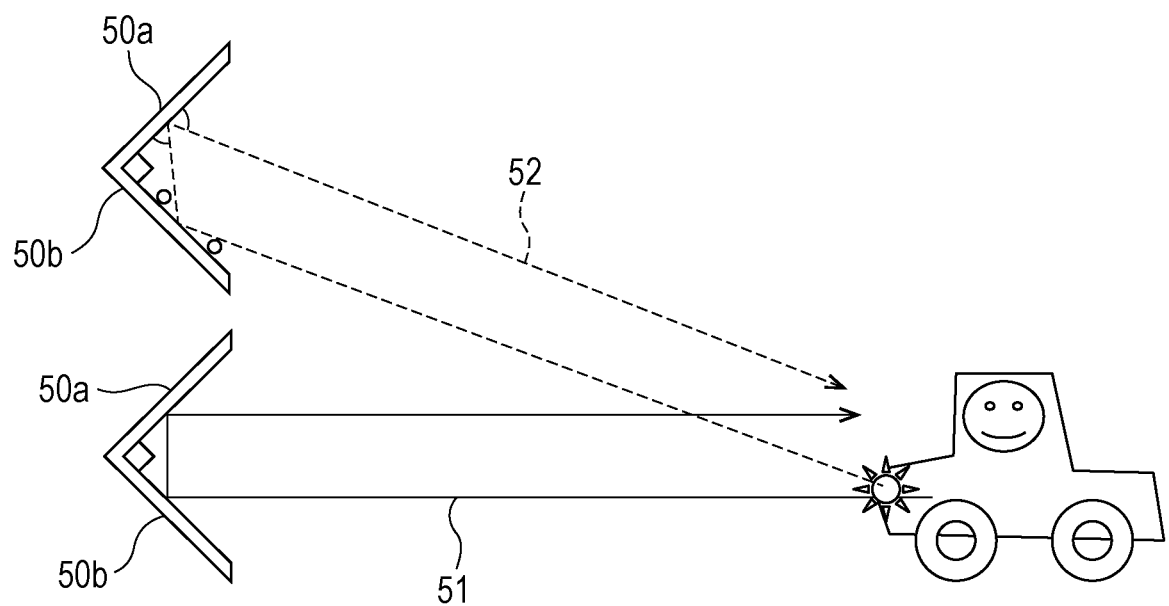
FIG. 2 is a cross-sectional view illustrating a principle of reflection of light or an electromagnetic wave by an optical member.
Figure 3:
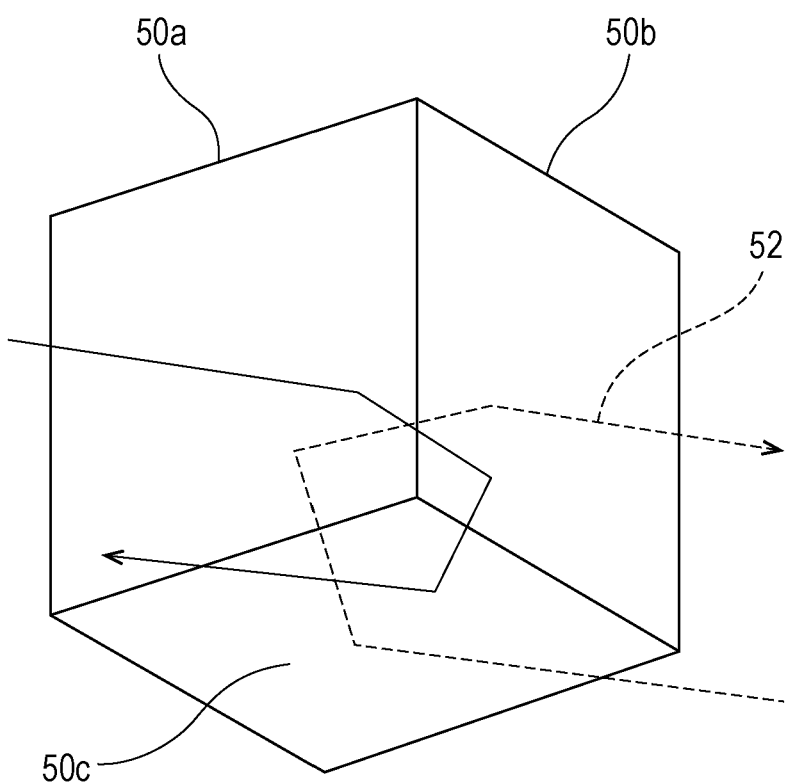
FIG. 3 is a perspective view illustrating a principle of reflection of light or an electromagnetic wave by the optical member.

The term "retroreflection" refers to characteristics of light reflected back to a source of incident light. The retroreflection characteristics are widely used, for example, for a reflective material of a traffic sign. FIG. 2 is a conceptual diagram illustrating the principle of retroreflection. When light or an electromagnetic wave enters mirrors 50a and 50b that are orthogonal to each other, the light or the electromagnetic wave is reflected twice as indicated by the solid-line arrow 51 or the dotted-line arrow 52. A total of a sum of reflection angles of the two reflections and an angle (90 degrees) formed between the mirror 50a and the mirror 50b is 180 degrees. Accordingly, reflected light or a reflected electromagnetic wave that is reflected by the mirror 50a and the mirror 50b travels in an opposite direction to the incident direction. Hereinafter, the travelling direction of the light or the electromagnetic wave travelling in the opposite direction to the incident direction is referred to as a "retroreflection direction". In a case where three mirrors 50a through 50c are disposed so as to be orthogonal to one another as illustrated in FIG. 3, light or an electromagnetic wave that enters the three mirrors 50a through 50c is reflected three times and is reflected in a retroreflection direction.

In a case where the configuration of these three mirrors 50a through 50c (e.g., an angle at which the mirrors 50a through 50c intersect, irregularity of surfaces of the mirrors 50a through 50c) changes and does not satisfy a condition for retroreflection, the direction in which the reflected light or the reflected electromagnetic wave travels is deviated from the retroreflection direction. The state measurement system according to First Embodiment is configured to visualize and measure a state of an object to be measured by utilizing this property.

Also in a conventional measurement method such as a measurement method using laser, a member having retroreflection characteristics is attached to an object to be measured. However, in the conventional measurement method, the shape and reflection characteristic of the retroreflection member are not changed. In the conventional measurement method, a member having retroreflection characteristics is used just to make an object to be measured noticeable by increasing the intensity of radiation of reflected light.

Meanwhile, in First Embodiment, a state of the visualizer 1 changes in accordance with a change of a state of the object to be measured 100, and the retroreflection characteristics change accordingly. According to this configuration, as the distance between the imaging device 3 and the visualizer 1 becomes larger, a position which the reflected light or the reflected electromagnetic wave reaches is deviated from the retroreflection direction in a larger degree just because an angle at which the three mirrors intersect is deviated from a right angle even by a slight degree. That is, according to the visualizer 1 according to First Embodiment, it is possible to amplify a change of a state of an object to be measured. Since the visualizer 1 can function as a highly sensitive sensor, it is possible to easily measure a change of a state of an object to be measured. Furthermore, sophisticated measurement such as measurement using a Doppler effect or measurement of a flight period by picoseconds is not needed to detect a change of a state of an object to be measured, unlike the conventional measurement methods.

In First Embodiment, the optical member 12 includes a fixed mirror 13 fixed to the housing 11 and a movable mirror 14 floating on a surface of a transparent liquid 15 as illustrated in FIG. 1. The fixed mirror 13 is an example of another part of the optical member 12 and is an example of a fixed part having a fixed relative positional relationship with the object to be measured 100. The movable mirror 14 is an example of one part of the optical member 12 and is an example of a movable part supported so as to be movable with respect to the fixed part. The liquid 15 is an example of a support member. The movable mirror 14 is supported so that a relative positional relationship thereof with the fixed mirror 13 changes in accordance with a change of a state of the object to be measured 100. The fixed mirror 13 and the movable mirror 14 each have, in a part serving as a mirror surface reflecting light or an electromagnetic wave, a metal having high reflectivity such as aluminum, a high-reflectivity film including a dielectric multilayer film, or the like. The housing 11 is made, for example, of a resin, a metal, or a combination thereof.

The fixed mirror 13 includes a reference mirror 13a and a bias mirror 13b that is disposed so as to be tilted forward with respect to the reference mirror 13a by a predetermined angle (e.g., 0.1 degrees to 1 degree). The reference mirror 13a and the bias mirror 13b each has a linear prism shape. That is, the reference mirror 13a and the bias mirror 13b each has a plurality of rectangular mirror surfaces that are disposed in a zig-zag manner so that long sides thereof are connected to one another and are orthogonal to one another.

In First Embodiment, the reference mirror 13a is fixed to the housing 11 so that linear ridge lines thereof extend in the vertical direction. The bias mirror 13b is disposed adjacent to the reference mirror 13a and is fixed to the housing 11. The bias mirror 13b is tilted with respect to the reference mirror 13a by a predetermined angle δ (e.g., 0.1 degrees to 1 degree) so that the linear ridge lines of the bias mirror 13b separates farther from the housing 11 to the front side (the lighting device 2 side) as a distance to an upper side of the linear ridge lines becomes shorter (see FIG. 4A). The reference mirror 13a and the bias mirror 13b, for example, may have different color filters on front surfaces thereof or may have different shapes so as to be distinguishable from each other.

In a case where the ridge lines of the reference mirror 13a extend in the vertical direction, the movable mirror 14 is disposed so as to be orthogonal to two rectangular mirror surfaces that are adjacent to each other and orthogonal to each other. That is, the two mirror surfaces of the reference mirror 13a and the movable mirror 14 each correspond to any one of the three mirrors 50a through 50c described with reference to FIG. 3. Accordingly, a light beam A1 emitted from the lighting device 2 is reflected by the two mirror surfaces of the reference mirror 13a and the movable mirror 14 and travels in the retroreflection direction as indicated by the solid-line arrow of FIG. 1.

Figure 4A:
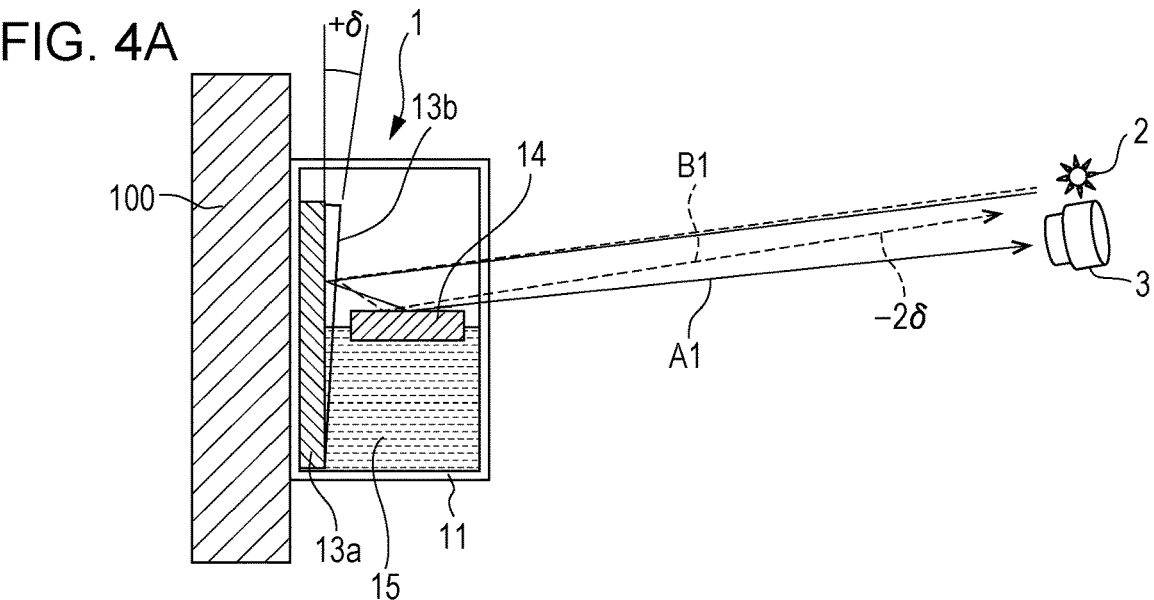
FIG. 4A is a cross-sectional view of the measurement system of FIG. 1 and illustrates a state where a state of an object to be measured has not changed.
Figure 4B:
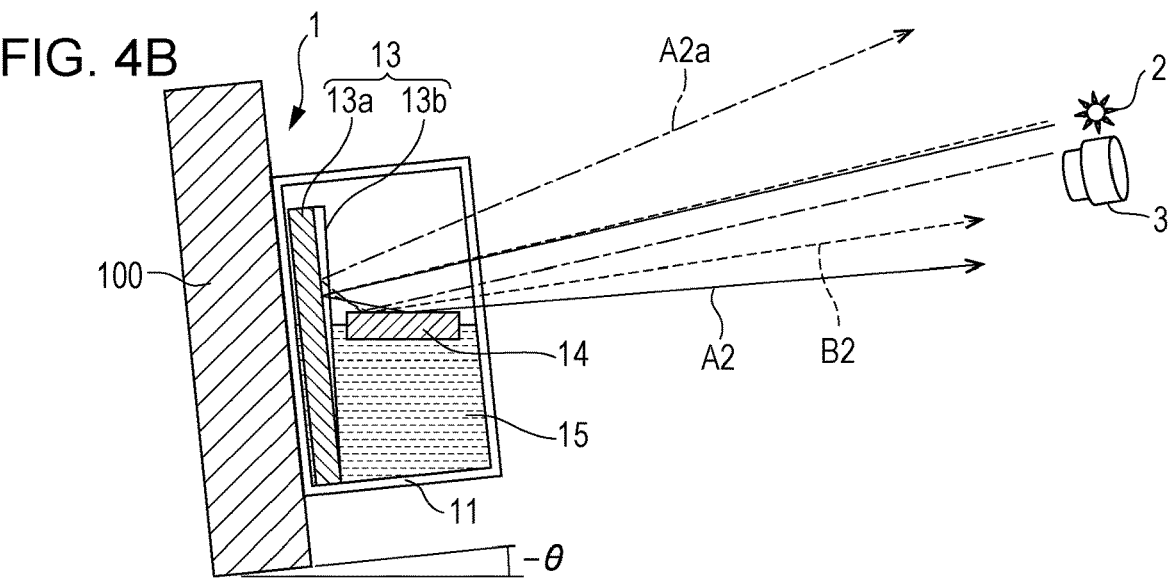
FIG. 4B is a cross-sectional view of the measurement system of FIG. 1 and illustrates a state where the object to be measured is tilted with respect to a horizontal plane by an angle $-\theta$.
Figure 4C:
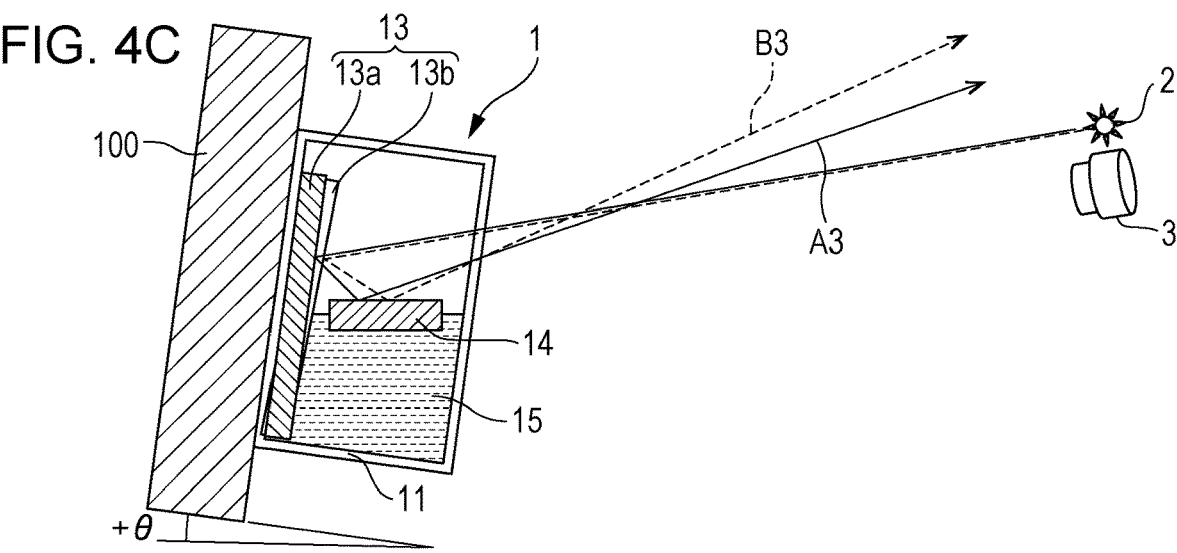
FIG. 4C is a cross-sectional view of the measurement system of FIG. 1 and illustrates a state where the object to be measured is tilted with respect to the horizontal plane by an angle $+\theta$.

FIGS. 4A through 4C are cross-sectional views each illustrating the measurement system of FIG. 1. FIG. 4A illustrates a state where the state of the object to be measured 100 has not changed. FIG. 4B illustrates a state where the object to be measured 100 is tilted with respect to a horizontal plane by an angle −θ. FIG. 4C illustrates a state where the object to be measured 100 is tilted with respect to the horizontal plane by an angle +θ. In the drawings, a clockwise angle with respect to a reference direction or a reference plane is expressed by using "+", and a counterclockwise angle with respect to the reference direction or the reference plane is expressed by using "−".

As illustrated in FIG. 4A, in the state where the state of the object to be measured 100 has not changed, the reference mirror 13a extends in the vertical direction and the bias mirror 13b is tilted with respect to the vertical direction by an angle +δ. In this state, light or an electromagnetic wave emitted from the lighting device 2 to the reference mirror 13a is reflected by the two mirror surfaces of the reference mirror 13a and the movable mirror 14 and travels in a retroreflection direction A1 as indicated by the solid-line arrow. Meanwhile, light or an electromagnetic wave emitted from the lighting device 2 to the bias mirror 13b is reflected by the two mirror surfaces of the bias mirror 13b and the movable mirror 14 and travels in a reflection direction B1 as indicated by the dash-line arrow. The reflection direction B1 is deviated from the retroreflection direction A1 by an angle −2δ.

As illustrated in FIG. 4B, in the state where the object to be measured 100 is tilted with respect to the horizontal plane by the angle −θ, the reference mirror 13a and the bias mirror 13b are tilted with respect to the horizontal plane by the angle −θ together with the object to be measured 100. Meanwhile, the movable mirror 14, which floats on the surface of the liquid 15, keeps a horizontal state. Accordingly, an angle of the reference mirror 13a with respect to the vertical direction is −θ. In this state, light or an electromagnetic wave emitted from the lighting device 2 to the reference mirror 13a is reflected by the reference mirror 13a and the movable mirror 14 and travels in a reflection direction A2. The reflection direction A2 is deviated from the retroreflection direction A1 by an angle +2θ.

As illustrated in FIG. 4C, in the state where the object to be measured 100 is tilted with respect to the horizontal plane by the angle +θ, the reference mirror 13a and the bias mirror 13b are tilted with respect to the horizontal plane by the angle +θ together with the object to be measured 100. Meanwhile, the movable mirror 14, which floats on the surface of the liquid 15, keeps a horizontal state. Accordingly, an angle of the reference mirror 13a with respect to the vertical direction is +θ. In this state, light or an electromagnetic wave emitted from the lighting device 2 to the reference mirror 13a is reflected by the reference mirror 13a and the movable mirror 14 and travels in a reflection direction A3. The reflection direction A3 is deviated from the retroreflection direction A1 by an angle −2θ.

For simplification of description, in FIGS. 4A through 4C, it is assumed that a single light beam or a single electromagnetic wave is emitted from the lighting device 2. However, actually, the whole optical member 12 is irradiated with light or an electromagnetic wave emitted from the lighting device 2. Therefore, for example, besides light or an electromagnetic wave reflected by the fixed mirror 13 and the movable mirror 14 in this order and travelling in the reflection direction A2, there is light or an electromagnetic wave reflected by the movable mirror 14 and the fixed mirror 13 in this order and travelling in a reflection direction A2a, as illustrated in FIG. 4B. The reflection direction A2a is deviated from the retroreflection direction A1 by an angle $-2\theta$. That is, the reflection direction A2a is deviated from the retroreflection direction A1 by the same angle as the reflection direction A3 illustrated in FIG. 4C. Therefore, both in a case where the object to be measured 100 is tilted with respect to the horizontal plane by the angle $-\theta$ and in a case where the object to be measured 100 is tilted with respect to the horizontal plane by the angle $+\theta$, there is reflected light or a reflected electromagnetic wave that is reflected in the same reflection direction. It is therefore impossible to determine in which direction the object to be measured 100 is tilted by using the reference mirror 13a only. The bias mirror 13b is provided in order to determine in which direction the object to be measured 100 is tilted.

Specifically, as illustrated in FIG. 4B, in the state where the object to be measured 100 is tilted with respect to the horizontal plane by the angle $-\theta$, an angle of the bias mirror 13b with respect to the vertical direction is $-\theta+\delta$. In this state, light or an electromagnetic wave emitted from the lighting device 2 to the bias mirror 13b is reflected by the bias mirror 13b and the movable mirror 14 and travels in a reflection direction B2. The reflection direction B2 is deviated from the retroreflection direction A1 by an angle $-2(-\theta+\delta)$. That is, the angle $2(\theta-\delta)$ formed between the reflection direction B2 and the retroreflection direction A1 is smaller than the angle $2\theta$ formed between the reflection direction A2 and the retroreflection direction A1, and the reflection direction B2 is closer to the retroreflection direction A1 than the reflection direction A2.

Meanwhile, as illustrated in FIG. 4C, in the state where the object to be measured 100 is tilted with respect to the horizontal plane by the angle $+\theta$, an angle of the bias mirror 13b with respect to the vertical direction is $+\theta+\delta$. In this state, light or an electromagnetic wave emitted from the lighting device 2 to the bias mirror 13b is reflected by the bias mirror 13b and the movable mirror 14 and travels in a reflection direction B3. The reflection direction B3 is deviated from the retroreflection direction A1 by an angle $-2(+\theta+\delta)$. That is, an angle $2(\theta+\delta)$ formed between the reflection direction B3 and the retroreflection direction A1 is larger than the angle $2\theta$ formed between the reflection direction A3 and the retroreflection direction A1, and the reflection direction B3 is farther from the retroreflection direction A1 than the reflection direction A3.

It can therefore be determined that the object to be measured 100 is tilted with respect to the horizontal plane by the angle $-\theta$ in a case where a reflection direction of light or an electromagnetic wave reflected by the bias mirror 13b is closer to the retroreflection direction A1 than a reflection direction of light or an electromagnetic wave reflected by the reference mirror 13a. Meanwhile, it can be determined that the object to be measured 100 is tilted with respect to the horizontal plane by the angle $+\theta$ in a case where a reflection direction of light or an electromagnetic wave reflected by the bias mirror 13b is farther from the retroreflection direction A1 than a reflection direction of light or an electromagnetic wave reflected by the reference mirror 13a.

Figure 5:
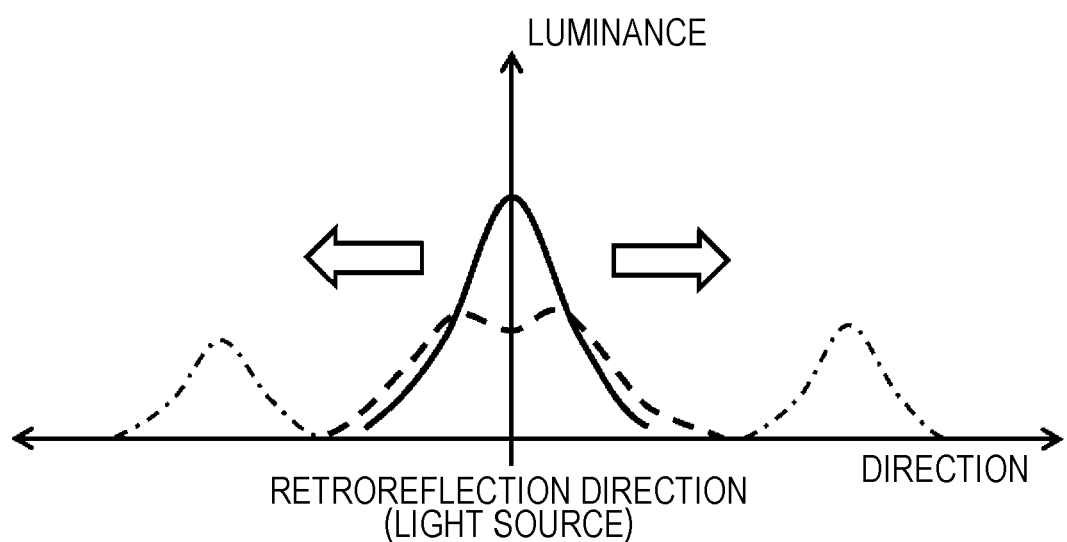
FIG. 5 is a graph conceptually illustrating diffuseness of reflected light reflected by a visualizer included in the measurement system of FIG. 1.

For simplification of description, in FIGS. 4A through 4C, it is assumed that each of the travelling directions A1 through A3 and B1 through B3 of reflected light or a reflected electromagnetic wave is a single line. Actually, however, the fixed mirror 13 and the movable mirror 14 each have slight unevenness, a placement error, an angle variation, and the like. For this reason, the reflected light or the reflected electromagnetic wave has diffuseness as indicated by the line with alternate long and short dashes K1 of FIG. 1. FIG. 5 is a graph conceptually illustrating diffuseness of light or an electromagnetic wave reflected by the visualizer 1 according to First Embodiment. The horizontal axis represents a direction in which reflected light travels. The vertical axis represents luminance. Deviation of reflected light from a retroreflection direction corresponds to a distance between a light source and a position which the reflected light reaches. In a case where the fixed mirror 13 and the movable mirror 14 are orthogonal to each other, a luminance distribution having a peak in the retroreflection direction is obtained as indicated by the solid line. As deviation of the reflection direction from the retroreflection direction becomes larger as illustrated in FIG. 4B, the peak is divided and a distance thereof from the center becomes longer as indicated by the solid line, the dashed line, and the line with alternate long and short dashes. Since such a change of a light distribution occurs in an analog manner, a change of a tilt angle can be grasped as a change of luminance by grasping the light distribution and a change thereof in advance.

In First Embodiment, the object to be measured 100 is tilted with respect to the horizontal plane by an angle $\pm\theta$, and an angle formed between the fixed mirror 13 and the movable mirror 14 changes accordingly, as illustrated in FIGS. 4B and 4C. Accordingly, a light distribution (reflection direction) of reflected light or a reflected electromagnetic wave travelling in the vicinity of the retroreflection direction changes in accordance with the tilt angle of the object to be measured 100 with respect to the horizontal plane. That is, there is a correlation between the tilt angle of the object to be measured 100 and a change of a light distribution of the reflected light or the reflected electromagnetic wave in the vicinity of the retroreflection direction. It is therefore possible to visualize and measure the tilt angle of the object to be measured 100 and a dynamic change of the tilt angle on the basis of a change of the light distribution of the reflected light or the reflected electromagnetic wave.

According to First Embodiment, in which the optical member 12 has retroreflection characteristics, light beams or electromagnetic waves that are reflected by a plurality of optical members 12 can be received by a single imaging device 3 by emitting light or an electromagnetic wave from the single lighting device 2 to the plurality of optical members 12. That is, by attaching a plurality of visualizers 1 onto the object to be measured 100 and emitting light or an electromagnetic wave from the lighting device 2 to the visualizers 1, it is possible to concurrently measure changes of luminance of reflected light or changes of light distributions of reflected electromagnetic waves reflected by the visualizers 1 by using the imaging device 3. This makes it possible to visualize the tilt angle of the object to be measured 100 and a dynamic change of the tilt angle and to measure the state of the object to be measured 100 in detail in a shorter period.

According to First Embodiment, in which the visualizer 1 does not include a component that consumes electric power, it is unnecessary to change batteries, and it is therefore possible to reduce the number of times of maintenance. Furthermore, the visualizer 1 can be manufactured at low cost, and degradation such as corrosion can be lessened.

According to First Embodiment, in which the optical member 12 is disposed in the housing 11, the optical member 12 is hardly affected by disturbance factors such as wind and corrosion. It is therefore possible to lessen the number of times of erroneous measurement caused by such disturbance factors. The surface of the housing 11 may be subjected to antifouling surface treatment. A wave absorber such as a porous resin may be provided on an inner surface of the housing 11. This makes it possible to make a liquid surface less wavy, thereby keeping rocking of the movable mirror 14 smaller. The liquid 15 may be transparent and have low volatility. The liquid 15 may be a material free from contamination and proliferation of bacteria and may be subjected to encapsulating processing free from contamination and proliferation of bacteria so that the liquid 15 does not become clouded.

The movable mirror 14 may be configured to have a very low natural vibration frequency. In this case, the movable mirror 14 is unlikely to follow vibration of a frequency higher than the natural vibration frequency. It is therefore possible to measure a temporal change of the tilt angle of the object to be measured 100, i.e., vibration by extracting a temporal change of luminance of reflected light from an image taken by the imaging device 3. Furthermore, a degree of soundness can be diagnosed in more detail by analyzing degradation of a structure by using both the tilt angle and vibration.

In a case where the lighting device 2 emits an electromagnetic wave, the electromagnetic wave may be an electromagnetic wave having a longer wavelength than light. In this case, external diameters of mirror surfaces of the fixed mirror 13 and the movable mirror 14 may be larger than the wavelength of the electromagnetic wave. With this configuration, even the case where the lighting device 2 emits an electromagnetic wave can be handled in a similar manner to a case where the lighting device 2 emits light. In a case where an electromagnetic wave having a long wavelength is used, the state of the object to be measured 100 can be measured even from a more remote place such as a satellite.

The reference mirror 13a and the bias mirror 13b may have, for example, different color filters on front surfaces thereof so as to be distinguishable from each other. Alternatively, the reference mirror 13a and the bias mirror 13b may have different shapes.

For convenience of description, in FIGS. 1 and 4A through 4C, a distance between the visualizer 1 and the lighting device 2 and a distance between the visualizer 1 and the imaging device 3 are short. However, these distances may be several tens of meters or more or may be several hundreds of meters or more. Furthermore, for example, it is also possible to employ a configuration in which the lighting device 2 and the imaging device 3 are provided on an earth observation satellite, and the lighting device 2 emits an electromagnetic wave, and the imaging device 3 receives a reflected electromagnetic wave, as in a case where a status on the earth is observed from an earth observation satellite by using a synthetic aperture radar.

In FIGS. 4A through 4C, the lighting device 2 emits light or an electromagnetic wave to the fixed mirror 13 and the movable mirror 14 from an obliquely upward direction. Instead, the lighting device 2 may emit light or an electromagnetic wave to the fixed mirror 13 and the movable mirror 14 from an obliquely downward direction. In this case, light or an electromagnetic wave emitted from the lighting device 2 enters the liquid 15 and is then refracted at a boundary between the liquid 15 and air. However, vibration of the object to be measured 100 can be measured in a similar manner to above, for example, by correcting an angle by using Snell's law.

In First Embodiment, the movable mirror 14 is made of a metal having high reflectivity such as aluminum or a high-reflectivity film including a dielectric multilayer film. However, the present disclosure is not limited to this. The movable mirror 14 may be made of a resin or a metal. A natural vibration frequency of an object floating on a liquid surface becomes higher as a ratio of specific gravity of the object to specific gravity of the liquid becomes smaller. Furthermore, an amplitude of the natural vibration becomes smaller as the ratio of the specific gravity of the object to the specific gravity of the liquid becomes closer to 1. In view of this, the specific gravity of the movable mirror 14 may be close to the specific gravity of the liquid 15. In a case where the movable mirror 14 is made of a resin (e.g., polyethylene) having smaller specific gravity than the liquid 15, the specific gravity may be adjusted, for example, by adding a weight. In a case where the movable mirror 14 is made of a metal having larger specific gravity than the liquid 15, the specific gravity may be adjusted, for example, by making the movable mirror 14 hollow and thereby making the movable mirror 14 buoyant.

In First Embodiment, one of the three mirrors of the optical member 12 is the movable mirror 14, and the other two of the three mirrors of the optical member 12 are the fixed mirror 13. However, the present disclosure is not limited to this. For example, two of the three mirrors of the optical member 12 may be the movable mirror 14, and one of the three mirrors of the optical member 12 may be the fixed mirror 13. In this case, the two movable mirrors 14 may be connected to two sides of the fixed mirror 13 by using an elastic member (e.g., a plate spring). Furthermore, a gap may be provided between the two movable mirrors 14 and the fixed mirror 13 so that the two movable mirrors 14 do not directly collide with each other. Furthermore, the two movable mirrors 14 may have a shock-absorbing material so that the two movable mirrors 14 do not directly collide with each other. According to this configuration, it is possible to achieve sensitivity to biaxial vibration.

In First Embodiment, the optical member 12 includes a single bias mirror 13b. However, the present disclosure is not limited to this. For example, the optical member 12 may include two or more bias mirrors 13b. In this case, tilt angles of two or more bias mirrors 13b with respect to the reference mirror 13a may be different. For example, in a case where the optical member 12 includes a bias mirror 13b that is tilted with respect to the reference mirror 13a by a larger angle, a tilt angle of the object to be measured 100 with respect to the horizontal plane can be measured even in a case where the tilt angle becomes large.

Figure 6A:
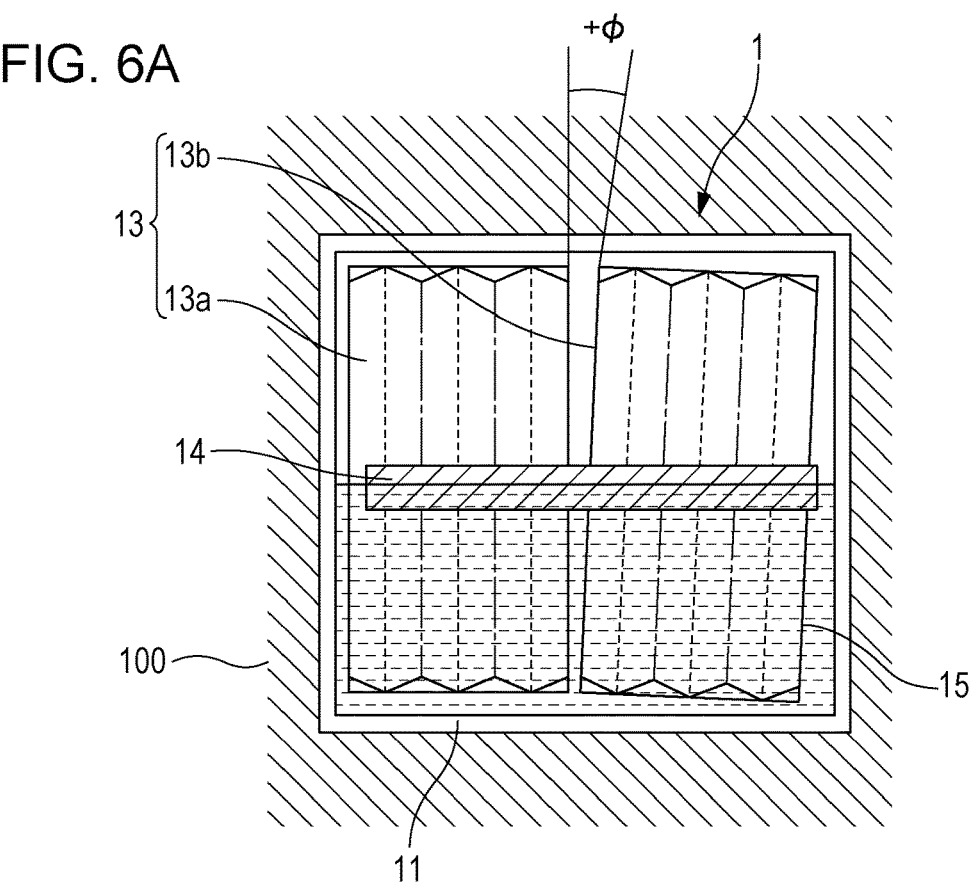
FIG. 6A is a side view illustrating a state where a bias mirror is tilted sideways so as to be spaced away from a reference mirror in a larger amount as a distance to an upper side becomes shorter in the visualizer included in the measurement system of FIG. 1 and illustrates a state where the state of the object to be measured has not changed.
Figure 6B:
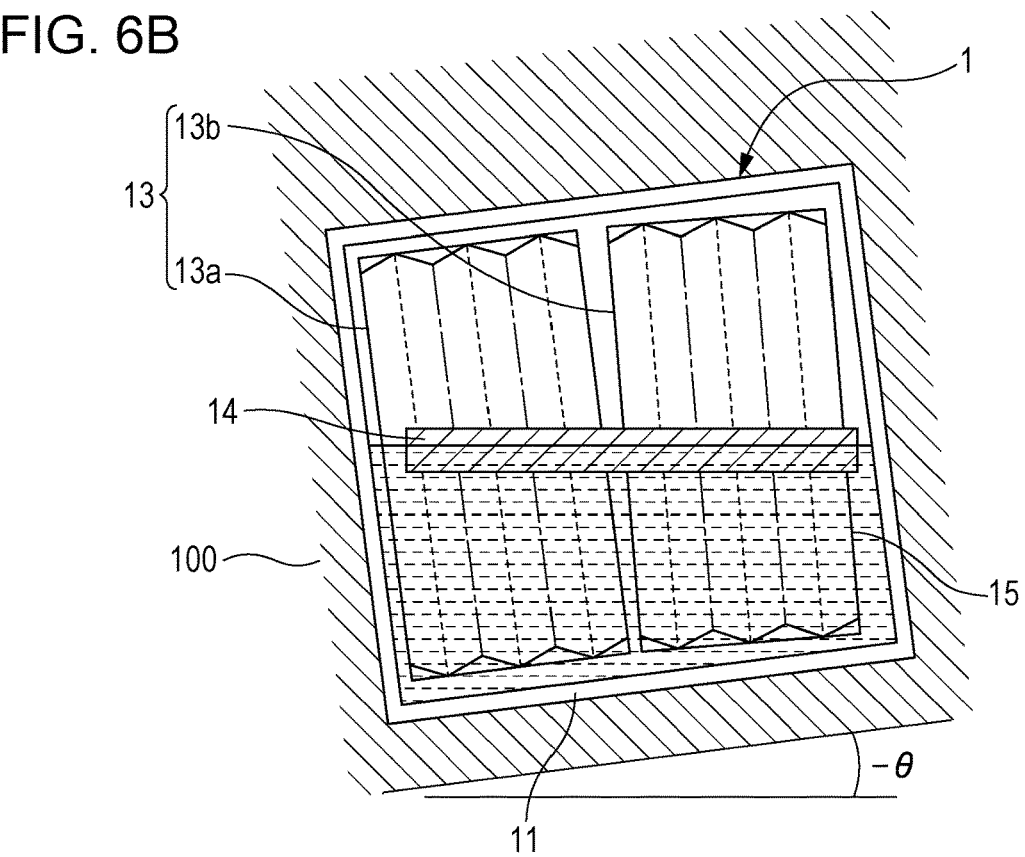
FIG. 6B is a side view illustrating a state where the visualizer of FIG. 6A is tilted with respect to the horizontal plane by an angle $-\theta$.

In First Embodiment, the bias mirror 13b is tilted to the front side with respect to the reference mirror 13a by a predetermined angle. However, the present disclosure is not limited to this. For example, the bias mirror 13b may be tilted by a predetermined angle φ (e.g., 0.1 degrees to 1 degree) so that the linear ridge lines of the bias mirror 13b separate from the reference mirror 13a sideways by a larger amount as a distance to an upper side of the linear ridge lines becomes shorter, as illustrated in FIGS. 6A and 6B. Also in this case, in a case where the object to be measured 100 is tilted with respect to the horizontal plane by an angle ±θ, an angle formed between the fixed mirror 13 and the movable mirror 14 changes, and a light distribution of reflected light or an reflected electromagnetic wave in the vicinity of the retroreflection direction received by the imaging device 3 changes accordingly. It is therefore possible to visualize and measure the tilt angle of the object to be measured 100 on the basis of a change of the light distribution of the reflected light or the reflected electromagnetic wave. FIG. 6A illustrates a state where the state of the object to be measured 100 has not changed. FIG. 6B illustrates a state where the object to be measured 100 is tilted with respect to the horizontal plane by an angle −θ.

The imaging device 3 may include a plurality of cameras or a compound-eye camera. In this case, it is possible to identify a direction and an angle of reflected light or a reflected electromagnetic wave in more detail by comparing a plurality of pieces of image information obtained by the plurality of cameras or the compound-eye camera. That is, even in a case where a change of the state of the object to be measured 100 is very small, a minute change of a direction and an angle of reflected light or a reflected electromagnetic wave can be observed by the plurality of cameras or the compound-eye camera.

Figure 7:
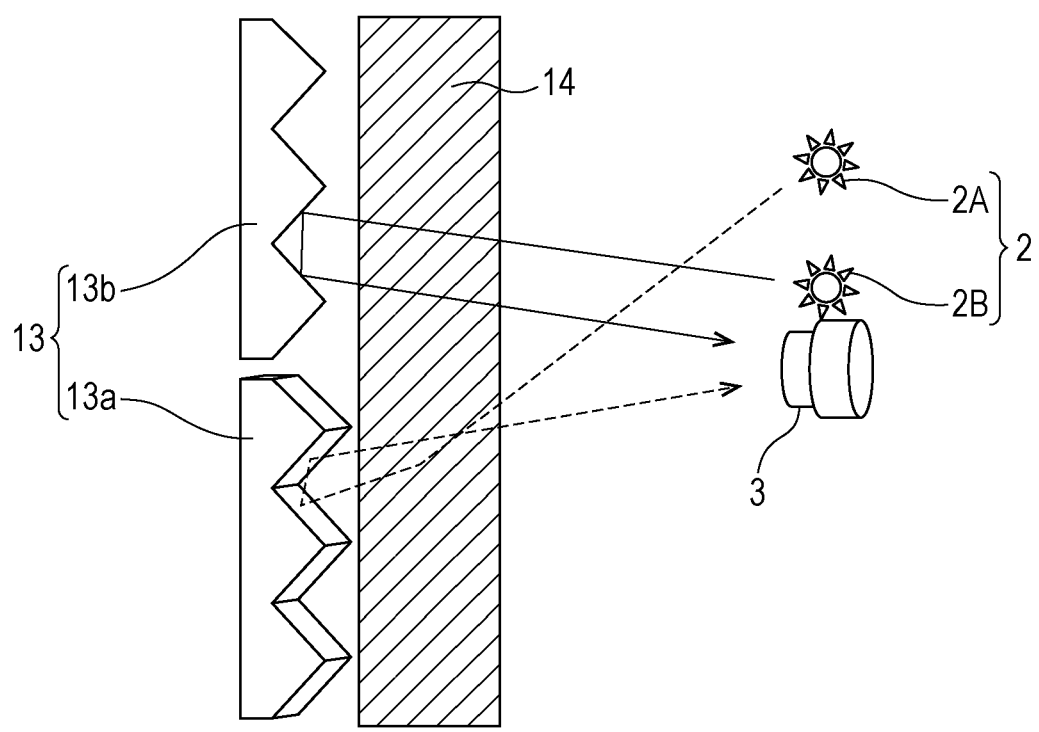
FIG. 7 is a plan view illustrating how light emitted from a plurality of light sources of the lighting device is reflected by the visualizer of FIG. 6B.

The lighting device 2 may include a plurality of light sources 2A and 2B that emit light or an electromagnetic wave toward the visualizer 1, as illustrated in FIG. 7. With this configuration, even in a case where the tilt angle (the angle θ in FIGS. 4A, 4B, and 6B) of the object to be measured 100 is large, a diffusion component of reflected light or a reflected electromagnetic wave originating from light or an electromagnetic wave emitted from any of the light sources 2A and 2B can be received by the imaging device 3. It is therefore possible to image a change of luminance of reflected light by using the imaging device 3. Alternatively, a single light source may be moved to positions of the light sources 2A and 2B.

The plurality of light sources may be aligned in the vertical direction or may be aligned in the horizontal direction. In a case where the object to be measured 100 is tilted forward or backward (see, for example, FIGS. 4B and 4C), a reflection direction of light or an electromagnetic wave is deviated in the vertical direction. Meanwhile, in a case where the object to be measured 100 is tilted leftward or rightward (see, for example, FIG. 6B), a reflection direction of light of an electromagnetic wave is deviated in the horizontal direction. In view of this, a plurality of light sources may be provided both in the vertical direction and in the horizontal direction. In this case, even in a case where the tilt angle of the object to be measured 100 in two directions (i.e., a front-back direction and a left-right direction) is large, a diffusion component of reflected light or a reflected electromagnetic wave originating from light or an electromagnetic wave emitted from any of the light sources 2 can be received by the imaging device 3. It is therefore possible to image a change of luminance of reflected light by using the imaging device 3. The plurality of light sources may be disposed at constant intervals or may be disposed at orderly intervals.

Light beams or electromagnetic waves emitted by the plurality of light sources 2A and 2B may be different from each other in terms of at least one of a wavelength, a polarization state, and an irradiation timing so as to be distinguishable from each other. The polarization state includes, for example, linear polarization and circular polarization. This makes it possible to measure a tilt angle in two directions (e.g., the vertical direction and the horizontal direction).

The plurality of light sources 2A and 2B may be disposed so that distances thereof from the imaging device 3 are different from each other. The plurality of light sources 2A and 2B may emit light or an electromagnetic wave in turn.

In this case, it is possible to detect a deviation angle of a reflection direction with respect to the retroreflection direction and thereby measure a tilt angle of the object to be measured 100 on the basis of changes of light distributions of reflected light or reflected electromagnetic waves originating from the light sources 2A and 2B.

It is desirable that light beams or electromagnetic waves emitted by the plurality of light sources 2A and 2B have different colors. In this case, it is possible to detect a deviation angle of a reflection direction with respect to the retroreflection direction and thereby measure a tilt angle of the object to be measured 100 on the basis of what color the visualizer 1 appears to have. For example, in a case where the visualizer 1 appears to have a color of light emitted from the light source 2A, light emitted from the light source 2A is retroreflected, and it can therefore be determined that the tilt angle of the visualizer 1 is zero. For example, in a case where the visualizer 1 appears to have a color that is mixture of a color of light emitted from the light source 2A and a color of light emitted from the light source 2B, it is possible to more accurately detect a deviation angle of a reflection direction with respect to the retroreflection direction on the basis of a ratio of the mixed colors.

Figure 8A:
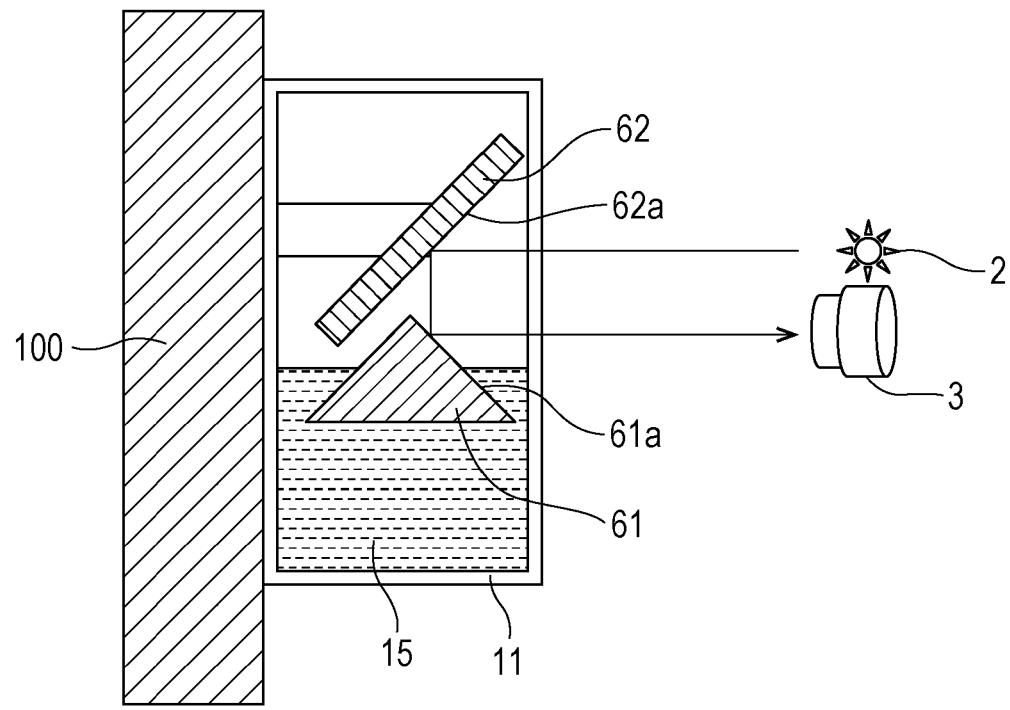
FIG. 8A is a cross-sectional view illustrating a modification of the visualizer included in the measurement system of FIG. 1.
Figure 8B:
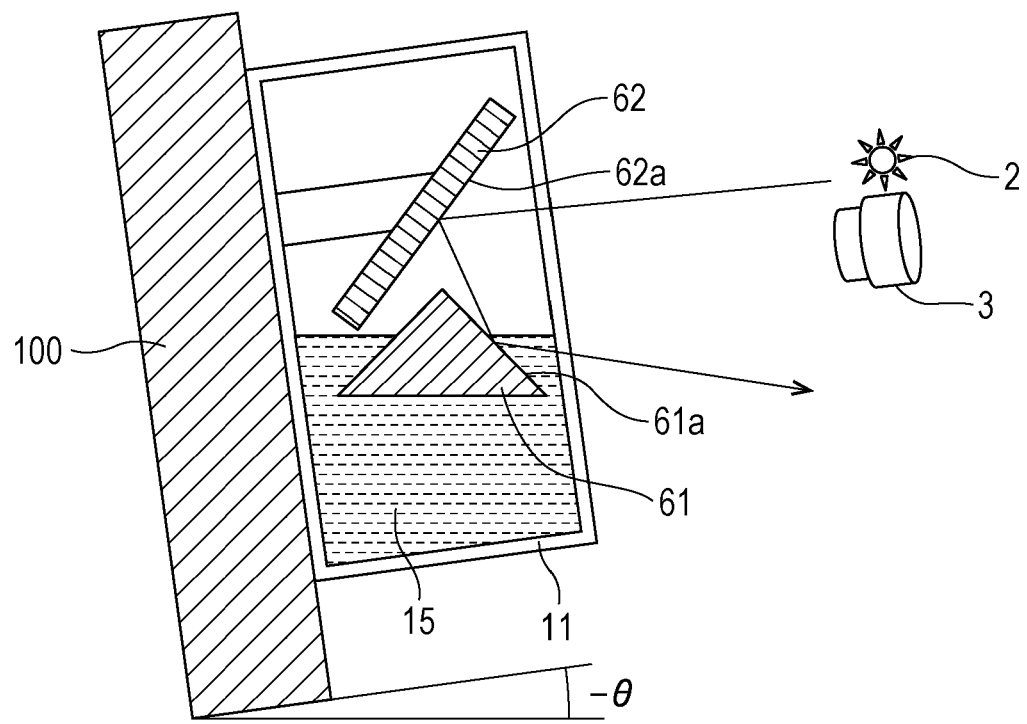
FIG. 8B is a cross-sectional view illustrating a state where the visualizer of FIG. 8A is tilted with respect to the horizontal plane by an angle $-\theta$.

In First Embodiment, the movable mirror 14 has a rectangular plate shape and reflects light or an electromagnetic wave on a mirror surface parallel with a liquid surface. However, the present disclosure is not limited to this. For example, a movable mirror 61 having a triangular prism shape may be used so that light or an electromagnetic wave is reflected by a mirror surface 61a that is tilted with respect to a liquid surface, as illustrated in FIGS. 8A and 8B. As illustrated in FIG. 8A, in a case where the state of the object to be measured 100 has not changed, light or an electromagnetic wave emitted from the lighting device 2 can be reflected in the retroreflection direction by fixing a fixed mirror 62 onto the object to be measured 100 so that a mirror surface 62a is orthogonal to the mirror surface 61a of the movable mirror 61. As illustrated in FIG. 8B, in a case where the object to be measured 100 is tilted with respect to the horizontal plane by an angle −θ, a travelling direction of reflected light or a reflected electromagnetic wave is deviated from the retroreflection direction by an angle +2θ. Accordingly, a light distribution of reflected light or a reflected electromagnetic wave in the vicinity of the retroreflection direction received by the imaging device 3 changes in accordance with a tilt state of the object to be measured 100. The tilt state of the object to be measured 100 can be measured on the basis of this change.

Figure 9A:
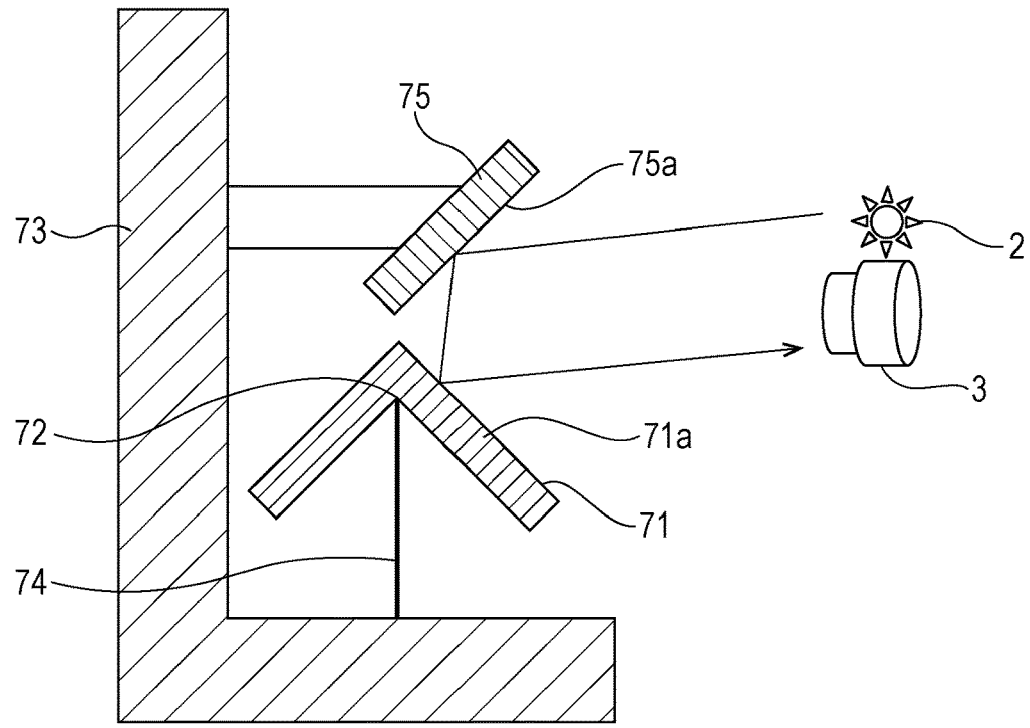
FIG. 9A is a cross-sectional view illustrating a modification of the visualizer included in the measurement system of FIG. 1.
Figure 9B:
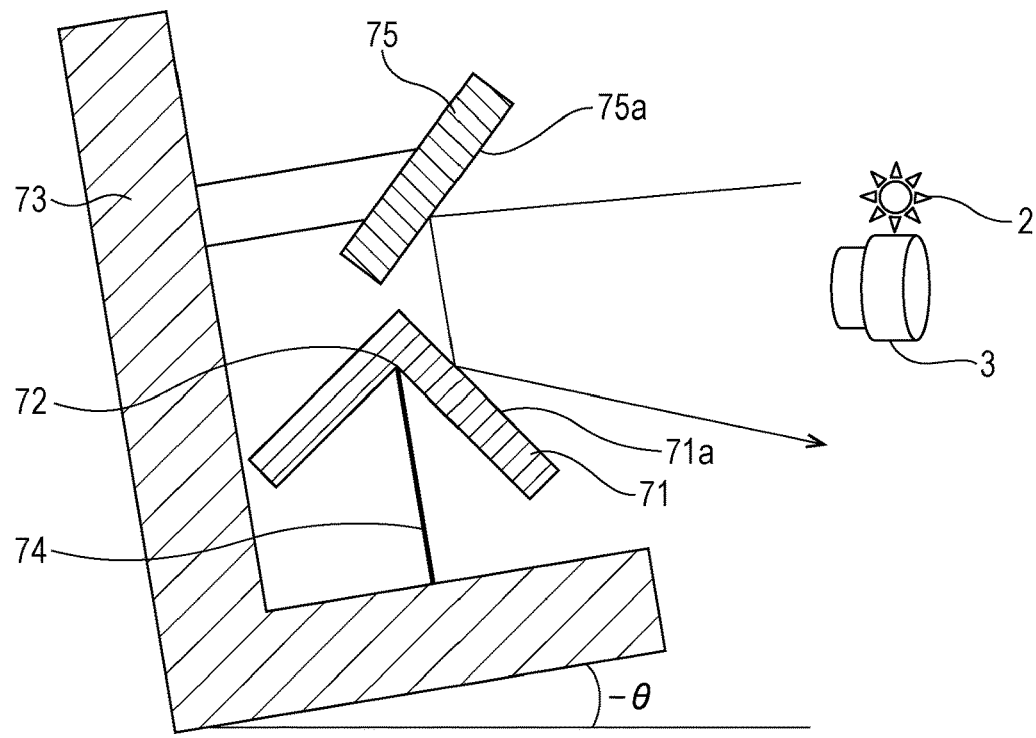
FIG. 9B is a cross-sectional view illustrating a state where the visualizer of FIG. 9A is tilted with respect to the horizontal plane by an angle $-\theta$.

In First Embodiment, the horizontal state of the movable mirror 14 is kept by floating the movable mirror 14 on the liquid surface of the liquid 15. However, the present disclosure is not limited to this. For example, it is also possible to employ a configuration in which a movable mirror 71 has an L shape, and an inner corner part 72 is supported from below by an end of a support rod 74, as illustrated in FIGS. 9A and 9B. The support rod 74 is an example of a support member and is fixed to a housing 73. The movable mirror 71 is supported so as to be freely movable, and therefore the center of gravity of the movable mirror 71 is always located below, in the vertical direction, the inner corner part 72 that is a supporting point. Accordingly, the mirror surface 71a of the movable mirror 71 can keep a posture tilted with respect to the horizontal direction by a predetermined angle (e.g., 45 degrees). Furthermore, the fixed mirror 75 is fixed to the housing 73 so that the mirror surface 71a of the movable mirror 71 and a mirror surface 75a of the fixed mirror 75 are orthogonal to each other, as illustrated in FIG. 9A. This makes it possible to reflect, in the retroreflection direction, light or an electromagnetic wave emitted from the lighting device 2. As illustrated in FIG. 9B, in a case where the housing 73 is tilted with respect to the horizontal plane by an angle −θ, a travelling direction of reflected light or a reflected electromagnetic wave is deviated from the retroreflection direction by an angle +2θ. Since a light distribution of reflected light or a reflected electromagnetic wave in the vicinity of the retroreflection direction received by the imaging device 3 changes in accordance with a tilt state of the object to be measured 100, the tilt state of the object to be measured 100 can be measured on the basis of this change.

Figure 10A:
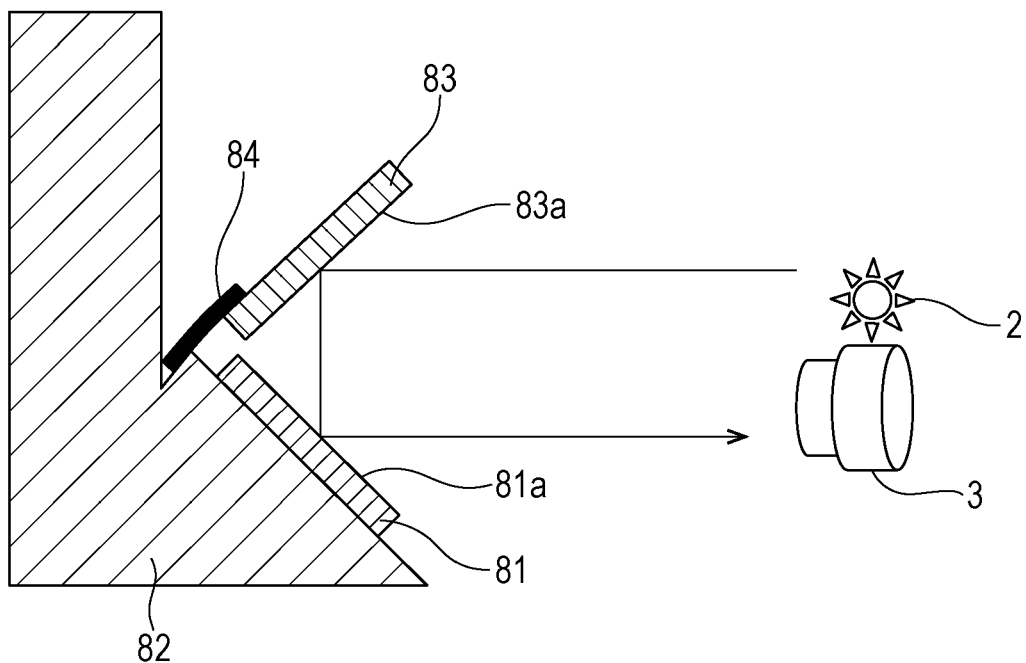
FIG. 10A is a cross-sectional view illustrating a modification of the visualizer included in the measurement system of FIG. 1.
Figure 10B:
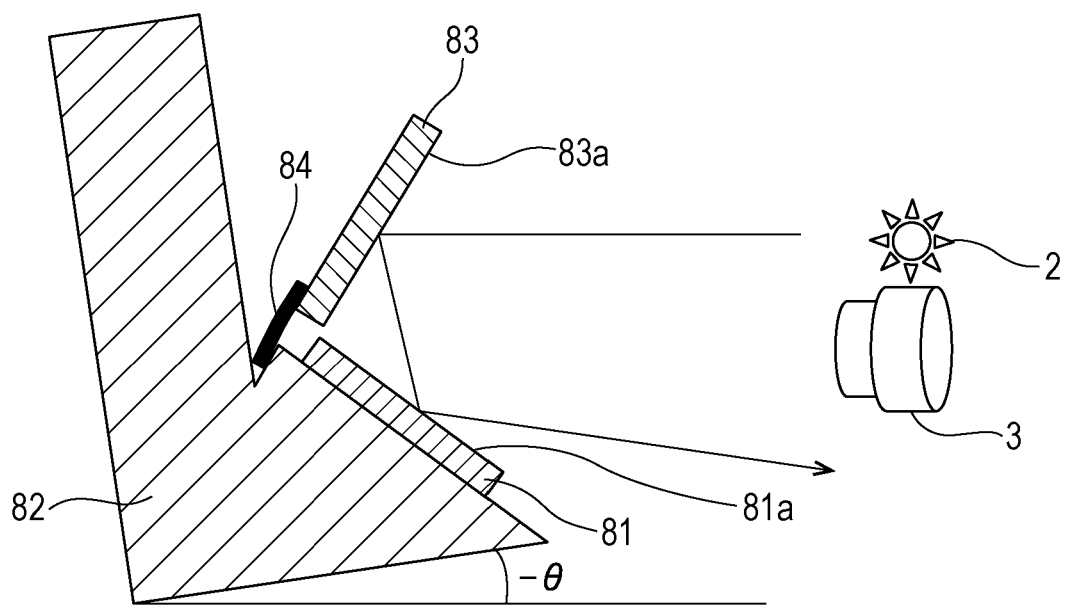
FIG. 10B is a cross-sectional view illustrating a state where the visualizer of FIG. 10A is tilted with respect to the horizontal plane by an angle −θ.

As illustrated in FIGS. 10A and 10B, a fixed mirror 81 may be fixed to a tilted surface of a housing 82. Furthermore, a movable mirror 83 may be supported, in the vicinity of an upper end of the fixed mirror 81, by the housing 82 with a spring 84 interposed therebetween. The spring 84 is an example of a support member and is, for example, a plate spring. As illustrated in FIG. 10A, in a case where the state of the housing 82 does not change, the spring 84 that is warped due to the gravity elastically supports the movable mirror 83. This allows a mirror surface 83a of the movable mirror 83 on the lighting device 2 side to keep a posture orthogonal to a mirror surface 81a of the fixed mirror 81. In this case, light or an electromagnetic wave emitted from the lighting device 2 can be reflected in the retroreflection direction. As illustrated in FIG. 10B, in a case where the housing 82 is tilted with respect to the horizontal plane by an angle −θ, a direction in which the spring 84 extends becomes closer to the vertical direction. This reduces load that is applied to deform the spring 84 by the gravity, thereby reducing warp of the spring 84. As a result, an angle formed between the mirror surface 81a of the fixed mirror 81 and the mirror surface 83a of the movable mirror 83 changes, and a reflection direction of light or an electromagnetic wave is deviated from the retroreflection direction by an angle +2θ. Since a light distribution of reflected light or a reflected electromagnetic wave in the vicinity of the retroreflection direction changes in accordance with a tilt state of the object to be measured 100, the tilt state of the object to be measured 100 can be measured on the basis of this change.

Since the load applied to deform the spring 84 changes in accordance with the tilt angle of the housing 82, the natural vibration frequency of the movable mirror 83 also changes in accordance with the tilt angle of the housing 82. That is, there is a correlation between the natural vibration frequency of the movable mirror 83 and the tilt angle of the housing 82. In general, the object to be measured 100 is always vibrating slightly, for example, due to wind or noise. Accordingly, the movable mirror 83 also vibrates mainly at a natural vibration frequency that varies depending on the vibration of the object to be measured 100. It is also therefore possible to measure the tilt angle of the housing 82 by measuring the natural vibration frequency of the movable mirror 83. However, temperature need be corrected for accurate measurement since an elastic constant of a spring depends on the temperature.

Figure 11A:
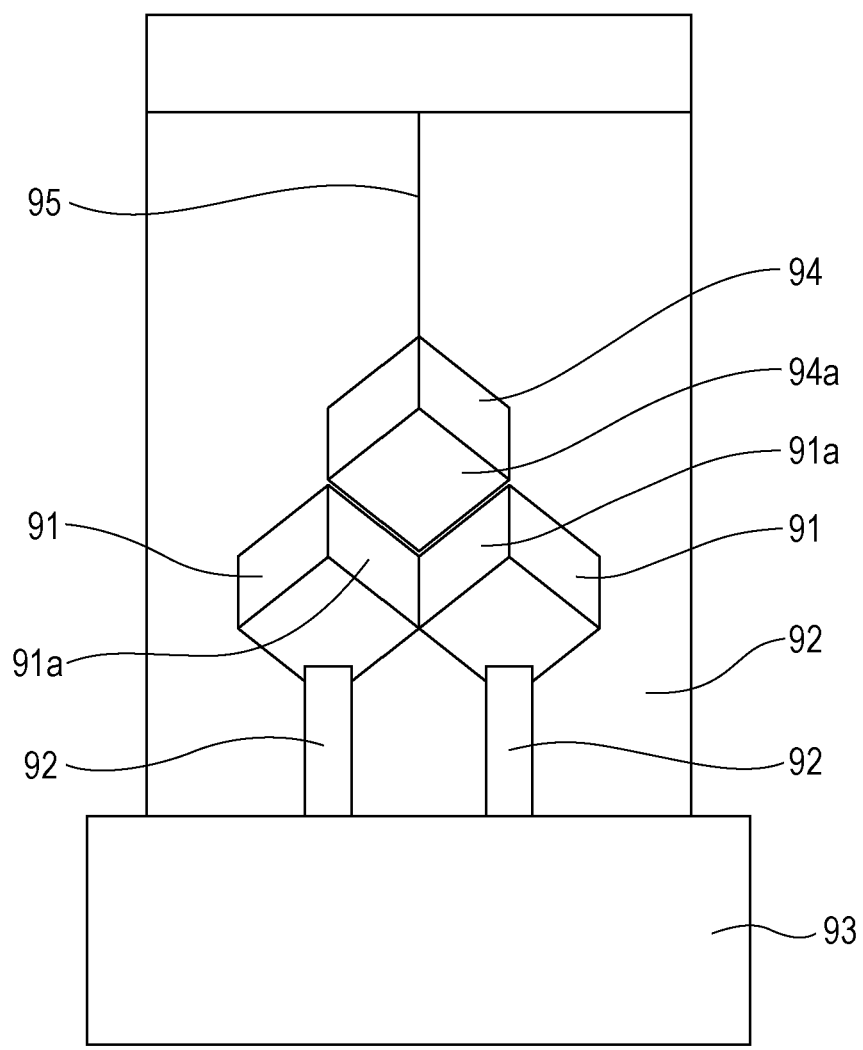
FIG. 11A is a front view illustrating a modification of the visualizer included in the measurement system of FIG. 1.
Figure 11B:
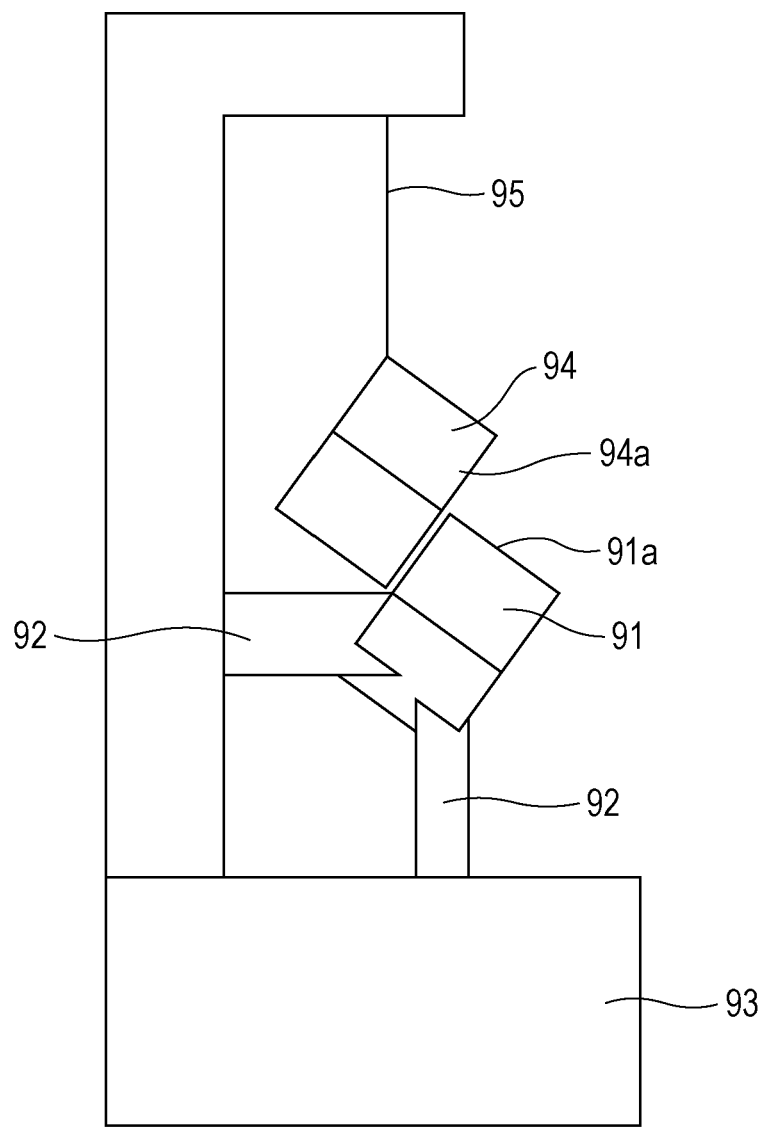
FIG. 11B is a side view illustrating the modification of the visualizer included in the measurement system of FIG. 1.
Figure 11C:
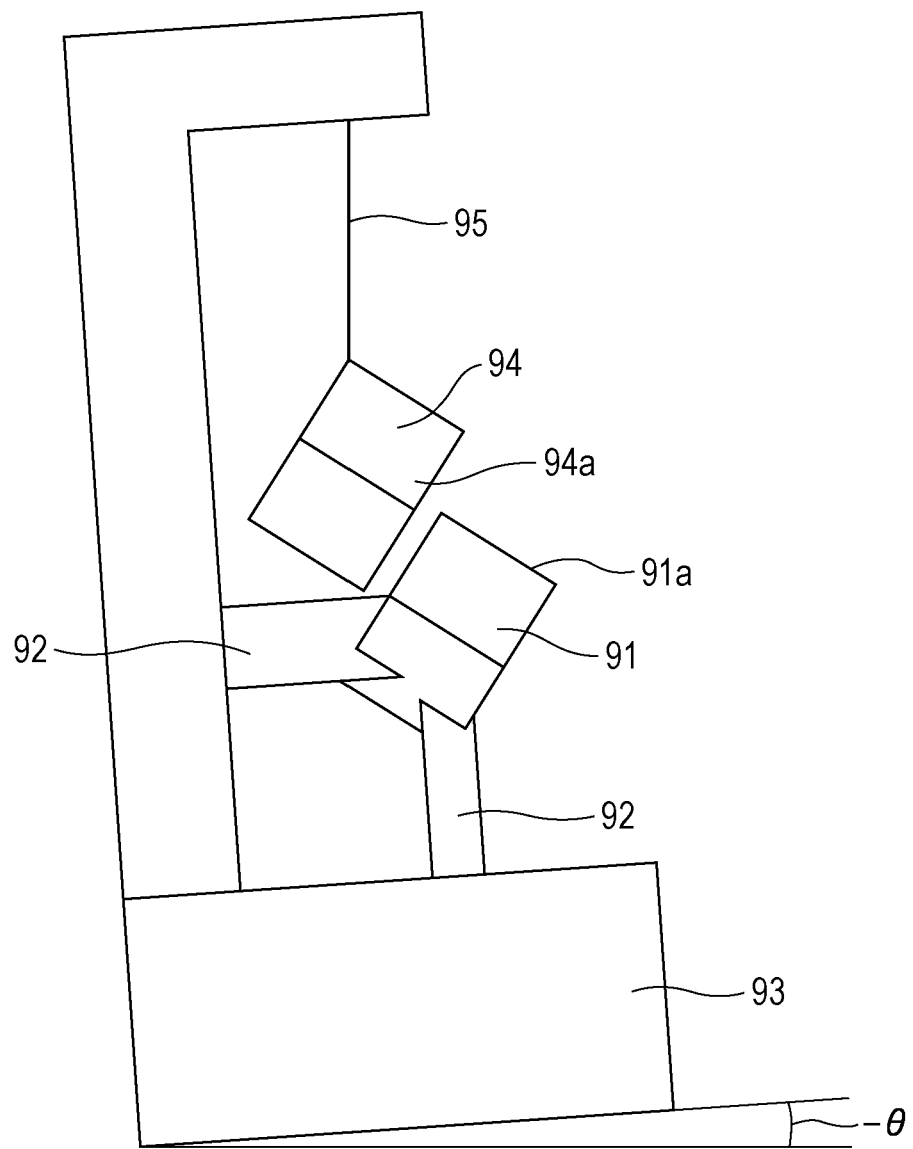
FIG. 11C is a side view illustrating a state where the visualizer of FIG. 11B is tilted with respect to the horizontal plane by an angle −θ.

As illustrated in FIG. 11A, each of two fixed mirrors 91 having a cubic shape may be fixed to a housing 93 with a fixing member 92 interposed therebetween. Furthermore, a movable mirror 94 having a cubic shape may be supported from above by a string 95. The string 95 is an example of a support member. As illustrated in FIGS. 11A and 11B, in a case where the state of the housing 93 has not changed, the string 95 supports the movable mirror 94 so that a mirror surface 94a of the movable mirror 94 keeps a posture orthogonal to mirror surfaces 91a of the fixed mirrors 91. In this case, light or an electromagnetic wave emitted from the lighting device 2 can be reflected in the retroreflection direction. As illustrated in FIG. 11C, in a case where the housing 93 is tilted with respect to the horizontal plane by an angle −θ, the fixed mirrors 91 are tilted by the angle −θ together with the housing 93. However, since the movable mirror 94 is supported by the string 95 so that the center of gravity thereof is directly below the string 95, the posture of the movable mirror 94 is kept. As a result, an angle formed between the mirror surfaces 91a of the fixed mirrors 91 and the mirror surface 94a of the movable mirror 94 changes, and a reflection direction of light or an electromagnetic wave is deviated from the retroreflection direction by an angle +2θ. Since a light distribution of reflected light or a reflected electromagnetic wave in the vicinity of the retroreflection direction changes in accordance with a tilt state of the object to be measured 100, the tilt state of the object to be measured 100 can be measured on the basis of this change.

According to the configurations described with reference to FIGS. 1, 4A through 4C, and 8A through 11C, when a tilt angle of an object to be measured changes, a fixed mirror moves together with the object to be measured. Meanwhile, a movable mirror is supported by a support member so that a relative position thereof with the fixed mirror is changed by utilizing gravity. According to such configurations, a relative positional relationship of the movable mirror with the fixed mirror can be changed in accordance with the tilt angle of the object to be measured. According to such configurations, it is therefore unnecessary to provide a component that consumes electric power. This eliminates necessity to change batteries, thereby reducing the number of times of maintenance. Furthermore, a visualizer can be manufactured at low cost, and degradation such as corrosion can be kept small.

Figure 12:
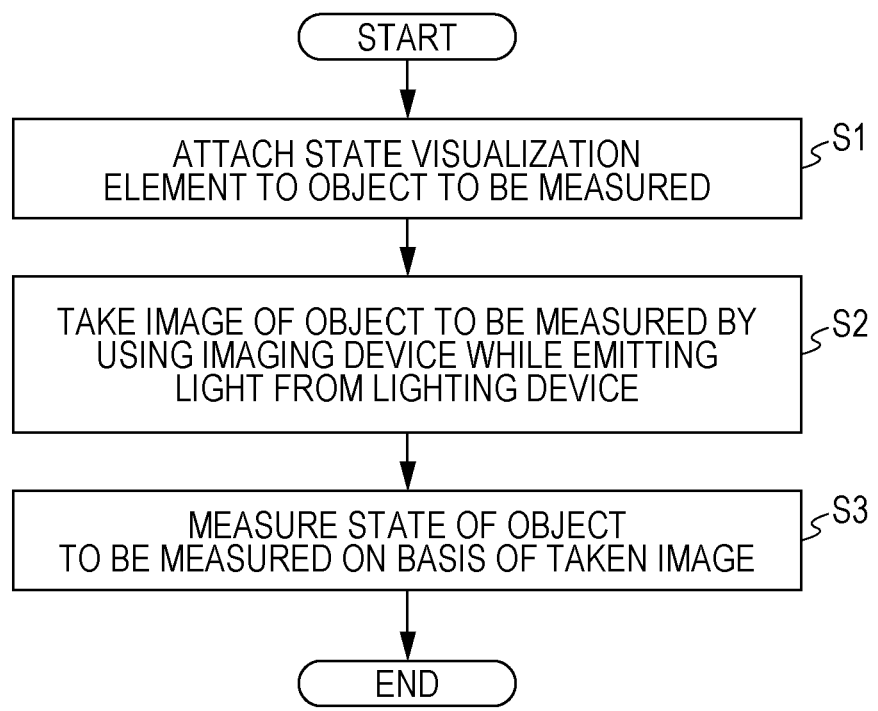
FIG. 12 is a flowchart of a measurement method using the measurement system of FIG. 1.
Figure 13:
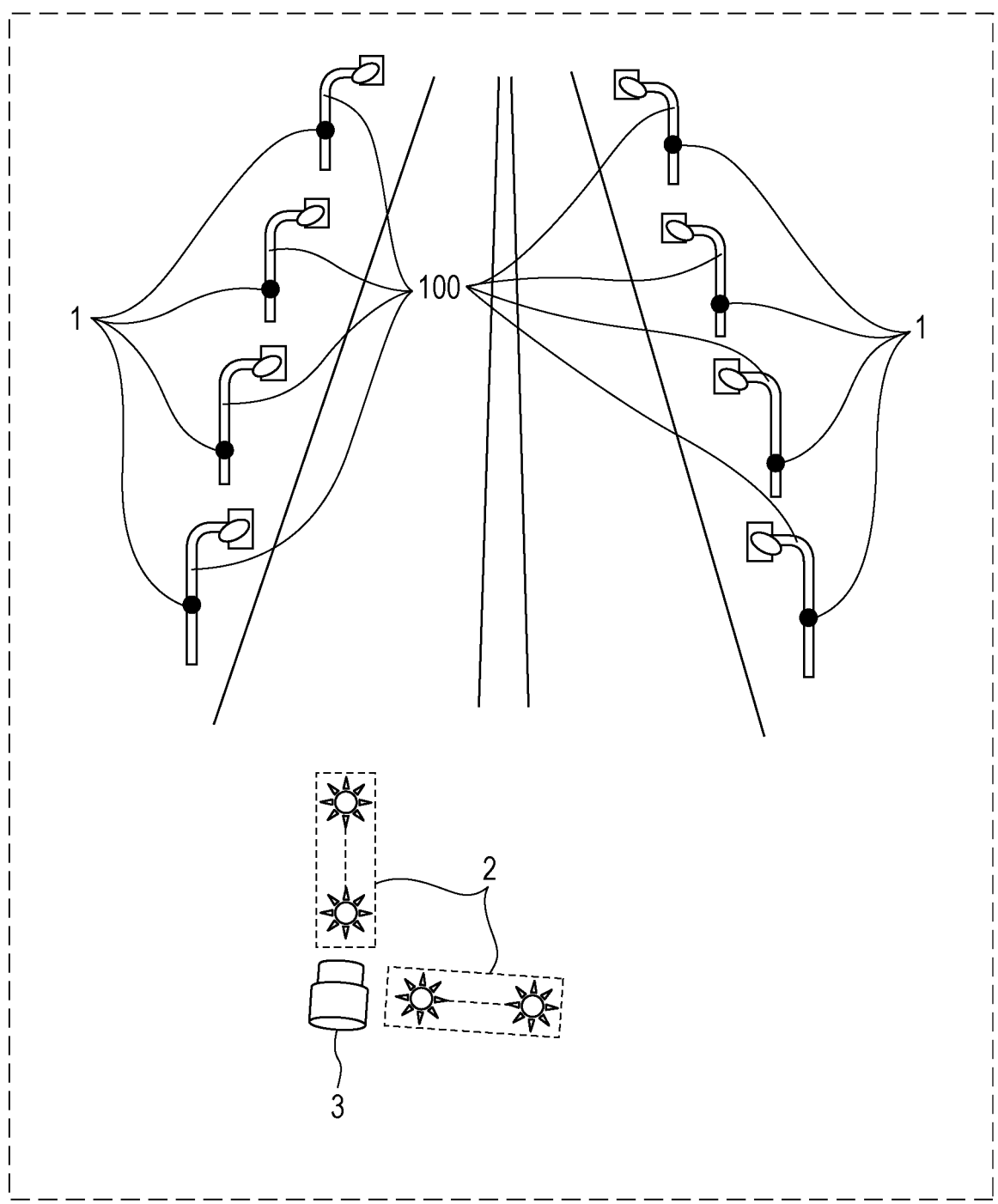
FIG. 13 is a perspective view illustrating how a plurality of lighting poles beside a road bridge are measured by using the measurement system of FIG. 1.

Next, a measurement method using the measurement system according to First Embodiment is described. FIG. 12 is a flowchart of the measurement method. The following describes an example where the object to be measured 100 is a plurality of lighting poles beside a road bridge and a tilt angle of each of the plurality of lighting poles is measured from a running vehicle or the like, as illustrated in FIG. 13. For simplification of description, it is assumed below that the lighting device 2 emits only light, and description about an electromagnetic wave is omitted. FIG. 13 illustrates an example in which the lighting device 2 includes a plurality of light sources that are aligned in a top-bottom direction and a left-right direction.

First, in Step S1, a plurality of visualizers 1 are attached to the objects to be measured 100.

The visualizers 1 according to First Embodiment, which do not include a component that consumes electric power, can be used for a long term once the visualizers 1 are attached to the objects to be measured 100. For this reason, the visualizers 1 may be firmly fixed to the objects to be measured 100 so as not to be detached from the objects to be measured 100.

Next, in Step S2, light is emitted from the lighting device 2 to the objects to be measured 100, and an image including reflected light reflected in a retroreflection direction by the optical members 12 of the visualizers 1 is taken by the imaging device 3, as illustrated in FIG. 13.

In Step S2, the plurality of light sources of the lighting device 2 emit light beams of different colors or emit light in turn toward the objects to be measured 100. In this case, in the image taken by the imaging device 3, colors of light beams reflected by the plurality of visualizers 1 change in accordance with tilt of the objects to be measured 100 or intensities of light beams reflected by the plurality of visualizers 1 change at a different timing in accordance with tilt of the objects to be measured 100.

Next, in Step S3, the measurement device 4 measures tilt angles of the objects to be measured 100 on the basis of the image taken by the imaging device 3. For example, the measurement device 4 performs image processing such as sampling of a change of luminance of pixels corresponding to positions of the visualizers 1 from frame images that constitute the image taken by the imaging device 3. This makes it possible to extract changes of luminance of the plurality of visualizers 1 in the image and to measure tilt angles of the plurality of objects to be measured 100. For example, the visualizer 1 attached to a lighting pole that is not tilted becomes bright when being irradiated with light by a light source closest to the imaging device 3 among the plurality of light sources of the lighting device 2. Meanwhile, the visualizer 1 attached to a lighting pole that is tilted appears to have a color of light emitted from a different light source among the plurality of light sources of the lighting device 2. An absolute value of a tilt angle also depends on a distance between the object to be measured 100 and the imaging device. It is therefore possible to calculate an absolute value of a tilt angle by calculating the distance, for example, on the basis of the image.

According to the measurement method according to First Embodiment, the plurality of visualizers 1 emit light beams of different colors or emit light at different timings in accordance with tilt angles of the objects to be measured 100. It is therefore possible to measure the tilt angles from the image taken by the imaging device 3. It is also possible to visually measure the tilt angles by selecting appropriate setting. Since reflected light retroreflected by the visualizer 1 has high directivity, the reflected light can be observed, for example, even from a position that is away by several hundreds of meters from the object to be measured 100. Furthermore, even in a case where an image is out of focus or blurred to some extent due to minute vibration of the imaging device 3 itself, reflected light can be detected and the state of the object to be measured 100 can be measured as long as the positional relationship between the imaging device 3 and the lighting device 2 is firmly fixed. It can therefore be said that the measurement method according to First Embodiment is a measurement method that is more resistant to noise and a change of an environment than the conventional method.

The measurement device 4 may include a storage unit in which data concerning a measured change of the state of the object to be measured 100 is accumulated and stored and a notification unit that gives a notification about an abnormality, for example, by a text or sound. The storage unit is, for example, a semiconductor memory. The notification unit is, for example, a monitor and/or a speaker. According to this configuration, it is possible to detect an abnormal portion and a degree of abnormality of the object to be measured 100 by comparing past data accumulated in the storage unit and data measured this time. Furthermore, when the notification unit notifies an administrator about the abnormality on the basis of a result of detection, maintenance of the object to be measured 100 can be conducted early.

The lighting device 2 and the imaging device 3 may be fixed at positions remote from the object to be measured 100 or may be installed on a movable body such as an automobile or a helicopter. In a case where the lighting device 2 and the imaging device 3 are fixed at positions remote from the object to be measured 100, the imaging device 3 may be placed, for example, beside the lighting device 2 illuminating a bridge for a safety purpose or for a dramatic effect. This allows fixed-point observation.

In a case where a commonly-available digital camera is used to take an image by using visible light, the image is desirably taken under a situation where influence of solar light is small, for example, during nighttime. In this case, the image taken by the imaging device 3 includes the objects to be measured 100 dimly illuminated by the lighting device 2, the visualizers 1 that brightly shine due to retroreflection, and background such as street lamps and light from buildings. It is necessary to extract positions of the plurality of visualizers 1 from this image. In this case, for example, the positions of the visualizers 1 can be identified by causing the lighting device 2 to blink at the start of measurement or during measurement and specifying parts that blink in synchronization with the light of the lighting device 2.

As the lighting device 2, an LED that emits light in a wavelength range in which a spectrum of solar light on the ground is weak due to absorption by water molecules, for example, in the vicinity of 1.35 µm or in the vicinity of 1.15 µm may be used. In this case, the influence of solar light can be lessened, and it is therefore possible to achieve measurement with a high SN ration even during daytime.

Second Embodiment

Figure 14:
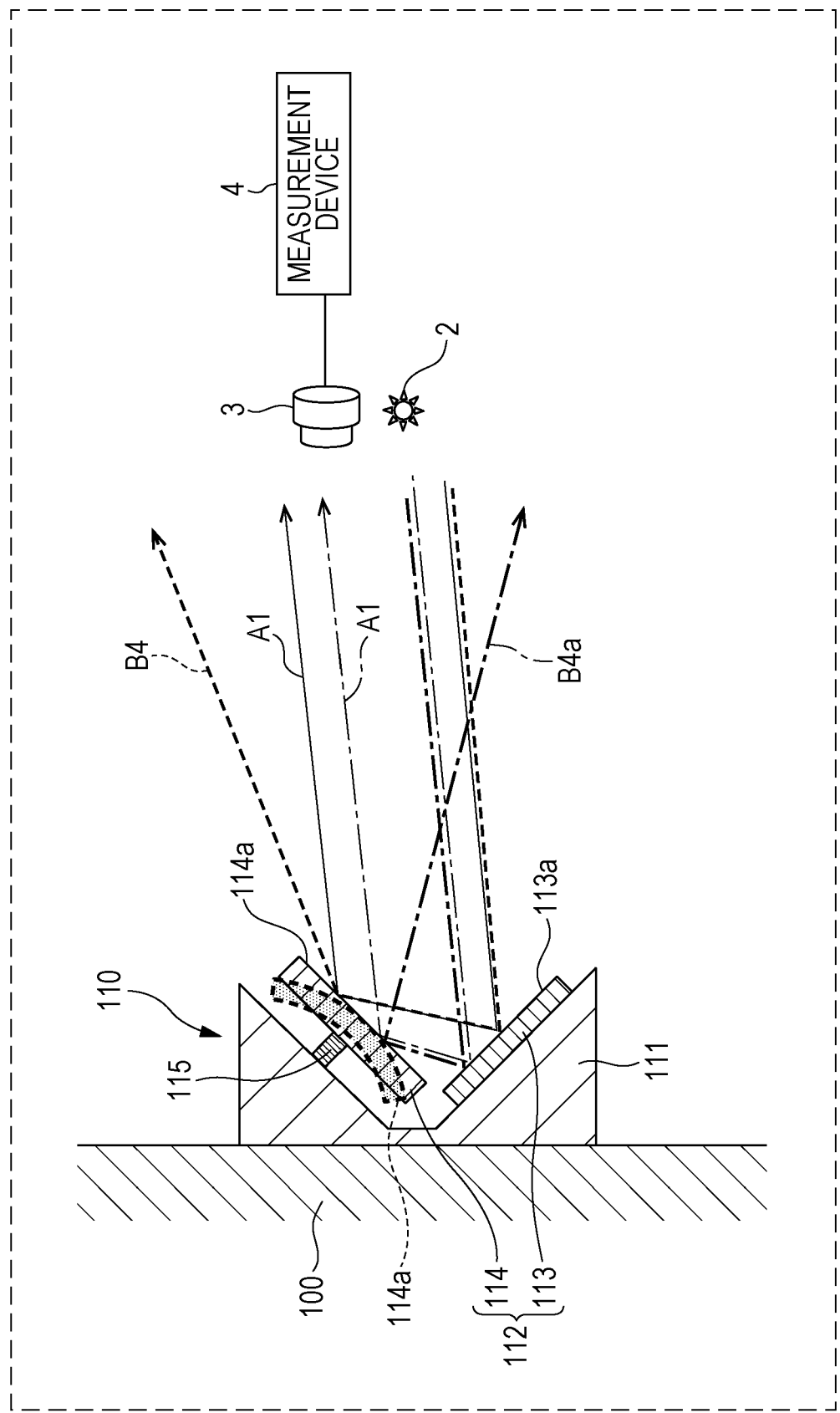
FIG. 14 illustrates an outline configuration of a measurement system according to Second Embodiment of the present disclosure.

FIG. 14 illustrates an outline configuration of a state measurement system according to Second Embodiment of the present disclosure.

The measurement system according to Second Embodiment is different from the measurement system according to First Embodiment in that the measurement system according to Second Embodiment includes a visualizer 110 instead of the visualizer 1. Second Embodiment is similar to First Embodiment except for this point.

The visualizer 110 performs measurement by changing a light distribution of reflected light or a reflected electromagnetic wave in the vicinity of a retroreflection direction in accordance with a change of a state of an object to be measured 100 by utilizing deformation of a bimetal caused, for example, by temperature or humidity.

Specifically, the visualizer 110 includes a housing 111 and an optical member 112 having light or electromagnetic wave retroreflection characteristics, as illustrated in FIG. 14.

The optical member 112 includes a fixed mirror 113 that is fixed to the housing 111 and a movable mirror 114 that is supported so as to be movable relative to the fixed mirror 113 in accordance with a change of a state of an object to be measured 100. The fixed mirror 113 is an example of another part of the optical member 112. The movable mirror 114 is an example of one part of the optical member 112.

The fixed mirror 113 and the movable mirror 114 have, in mirror surfaces 113*a* and 114*a* for reflecting light or an electromagnetic wave, a metal having high reflectivity such as aluminum, a high-reflectivity film including a dielectric multilayer film, or the like.

The movable mirror 114 includes a bimetal that deforms depending on temperature, humidity, an amount of moisture, a far-infrared ray, or radiation. In Second Embodiment, the bimetal included in the movable mirror 114 is formed by joining two kinds of materials that have different coefficients of expansion.

The movable mirror 114 is attached to the housing 111 with a connecting member 115 interposed therebetween. The connecting member 115 is, for example, attached to a central part of a surface of the movable mirror 114 opposite to the mirror surface 114a so that the movable mirror 114 can be deformed in accordance with a change of a state of the object to be measured 100.

In a case where the state of the object to be measured 100 has not changed, the mirror surface 114a of the movable mirror 114 is flat as indicated by the solid line in FIG. 14, and the mirror surface 114a of the movable mirror 114 and a mirror surface 113a of the fixed mirror 113 are orthogonal to each other. In this case, light or an electromagnetic wave emitted from the lighting device 2 is reflected in a retroreflection direction as indicated by the solid-line arrow A1.

In a case where the state of the object to be measured 100 has changed, the mirror surface 114a of the movable mirror 114 is curved as indicated by the dashed line in FIG. 14, and the mirror surface 114a of the movable mirror 114 and the mirror surface 113a of the fixed mirror 113 are not orthogonal to each other. In this case, light or an electromagnetic wave emitted from the lighting device 2 is reflected as indicated by the alternate-long-and-short-dash-line arrow B4 or the dashed-line arrow B4a. That is, the reflected light or the reflected electromagnetic wave widely diffuses.

Figure 15:
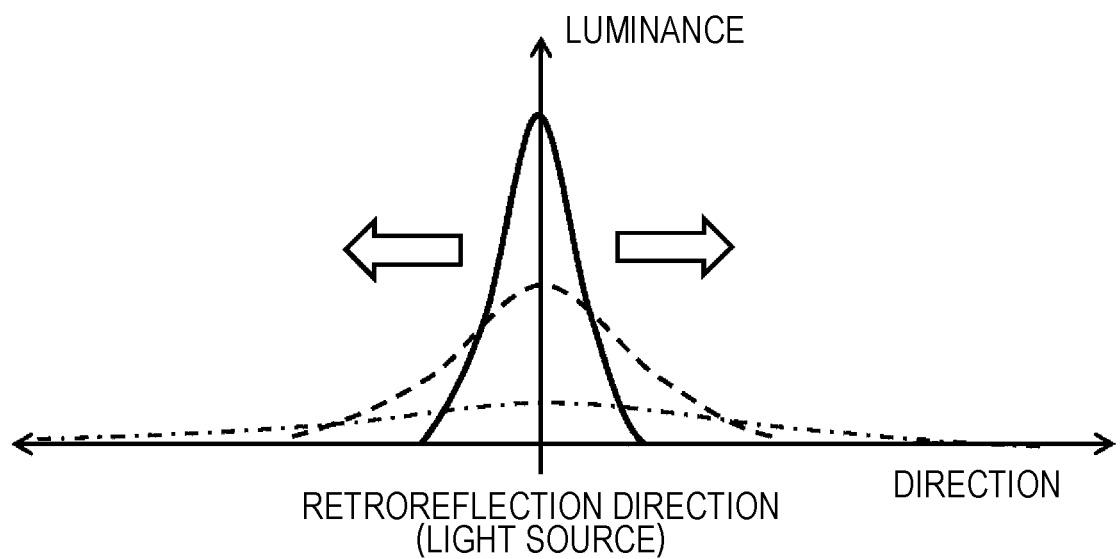
FIG. 15 is a graph conceptually illustrating diffuseness of reflected light reflected by a visualizer included in the measurement system of FIG. 14.

FIG. 15 is a graph conceptually illustrating diffuseness of light reflected by the visualizer 110 according to Second Embodiment. The horizontal axis represents a direction in which reflected light travels. The vertical axis represents luminance. Deviation of reflected light from the retroreflection direction corresponds to a distance between a light source and a position which the reflected light reaches. In a case where the mirror surface 114a of the movable mirror 114 is flat and where the fixed mirror 113 and the movable mirror 114 are orthogonal to each other, a luminance distribution having a peak in the retroreflection direction is obtained as indicated by the solid line. Meanwhile, in a case where the mirror surface 114a of the movable mirror 114 is curved, peak luminance in the retroreflection direction becomes lower as the curvature becomes larger as indicated by the dashed line or the line with alternate long and short dashes. It is possible to measure a state of the object to be measured 100 on the basis of such a change of luminance.

For simplification of description, in Second Embodiment, the optical member 112 includes a single fixed mirror 113. However, the present disclosure is not limited to this. The optical member 112 may include two fixed mirrors 113 that are orthogonal to each other. In a case where the two fixed mirrors 113 and the movable mirror 114 are disposed so as to be orthogonal to one another, light or an electromagnetic wave can be reflected in the retroreflection direction as described with reference to FIG. 3.

In Second Embodiment, the bimetal of the movable mirror 114 is formed by joining two kinds of materials that are different in terms of a coefficient of expansion caused by temperature or the like. However, the present disclosure is not limited to this. The materials, shape, and the like of the bimetal may be appropriately selected and designed in accordance with a measured state and a measurement range of the object to be measured 100.

Figure 16:
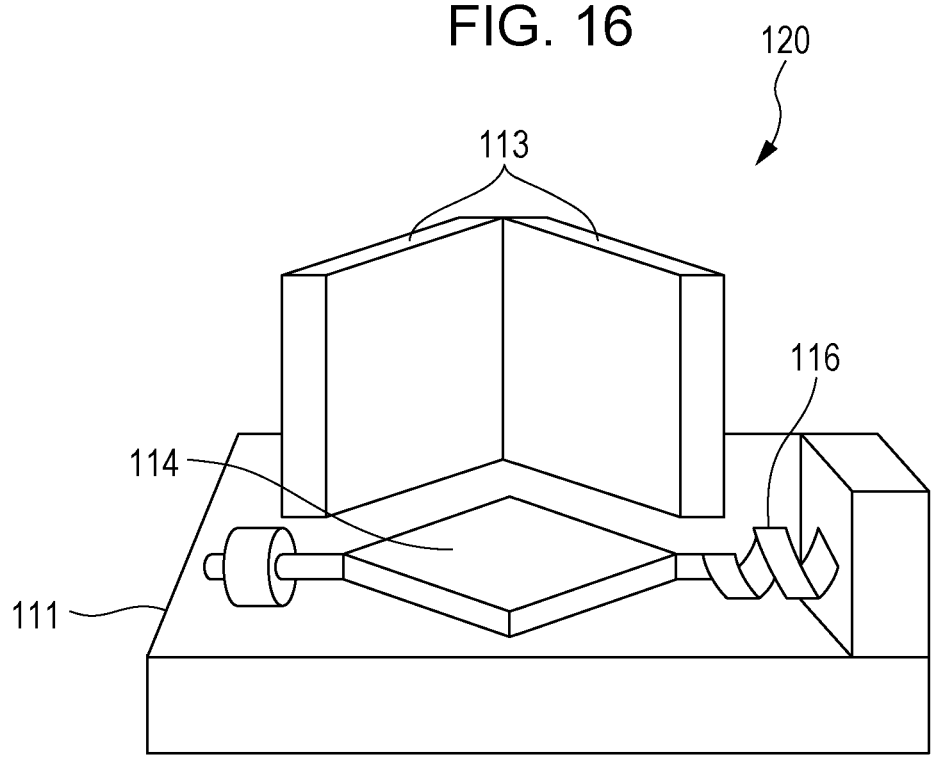
FIG. 16 is a perspective view illustrating a modification of the visualizer included in the measurement system of FIG. 14.

In Second Embodiment, the movable mirror 114 itself includes a bimetal. However, the present disclosure is not limited to this. For example, the movable mirror 114 may be attached to the housing 111 with the connecting member 116 constituted by a spiral bimetal interposed therebetween, as illustrated in FIG. 16. According to this configuration, the spiral bimetal rotates about a spiral axis in accordance with a change of a state of the object to be measured 100, and thus an angle formed between the two fixed mirrors 113 and the movable mirror 114 can be changed. In a case where the connecting member 115 is constituted by a bimetal, the shape of the bimetal can be set relatively freely. It is therefore easy to adjust sensitivity by changing a degree of deformation of the bimetal relative to a change of the state of the object to be measured 100.

The bimetal is not limited to a metal and can be, for example, paper or plastic. A similar effect can be obtained even by employing a material and a structure that change in accordance with a change of the state of the object to be measured 100 instead of the bimetal. For example, it is also possible to use a material having an elastic constant that changes in accordance with a change of the state of the object to be measured 100 and to visualize the state of the object to be measured 100 on the basis of the frequency of a change of intensity of reflected light travelling in the retroreflection direction. The frequency of a change of intensity of reflected light depends on a natural vibration frequency of the movable mirror 114.

A plane mirror (not illustrated) that is not deformed even when the state of the object to be measured 100 changes may be provided close to the movable mirror 114. According to this configuration, it is possible to accurately measure a change of the state of the object to be measured 100 on the basis of a ratio of reflectivity of the plane mirror and reflectivity of the movable mirror 114 in a similar manner to the case where it is determined in which direction the object to be measured 100 is tilted by using the reference mirror 13a and the bias mirror 13b in First Embodiment.

Third Embodiment

Figure 17:
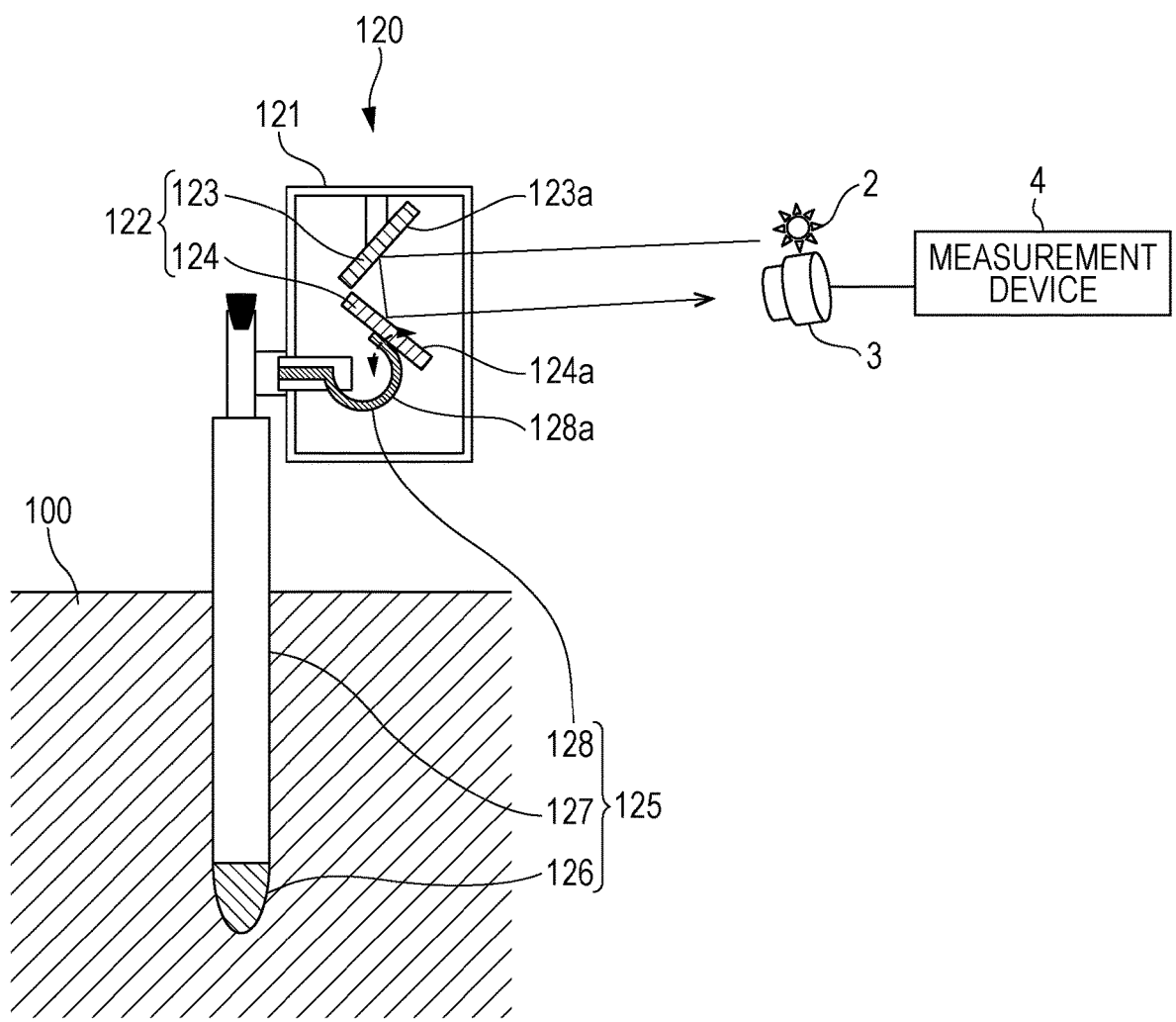
FIG. 17 illustrates an outline configuration of a measurement system according to Third Embodiment of the present disclosure.

FIG. 17 illustrates an outline configuration of a measurement system according to Third Embodiment of the present disclosure.

The measurement system according to Third Embodiment is different from the measurement system according to First Embodiment in that the measurement system according to Third Embodiment includes a visualizer 120 instead of the visualizer 1. Third Embodiment is similar to First Embodiment except for this point.

An object to be measured 100 is soil. The visualizer 120 is configured to measure a change of a state of an amount of moisture in the soil.

Specifically, the visualizer 120 includes a housing 121 and an optical member 122 having light or electromagnetic wave retroreflection characteristics, as illustrated in FIG. 17.

A tensiometer 125 is attached to the housing 121. The tensiometer 125 is an example of a stress unit that generates stress in accordance with a state of the object to be measured 100. The tensiometer 125 includes a porous cup 126, a pipe 127, and a Bourdon tube 128 having a curved part that is curved in a C shape.

The porous cup 126 is made, for example, of porous pottery. The porous cup 126 is attached to one end of the pipe 127. The Bourdon tube 128 is attached to the other end of the pipe 127. The Bourdon tube 128 has a curved part 128a that is curved in a C shape. The curved part 128a is disposed in the housing 121.

The porous cup 126 and the pipe 127 are filled with deaerated water and are hermetically sealed. When the porous cup 126 and the pipe 127 are inserted into humid soil, moisture is discharged from the porous cup 126 to the soil, and the pipe 127 is depressurized in accordance with an amount of discharged moisture. The curved part 128a of the Bourdon tube 128 is deformed so that a radius of curvature thereof changes due to this change of pressure.

The optical member 122 includes a fixed mirror 123 that is fixed to the housing 121 and a movable mirror 124 that is supported so as to be movable relative to the fixed mirror 123 in accordance with a change of a state of the object to be measured 100. The fixed mirror 123 is an example of another part of the optical member 122. The movable mirror 124 is an example of one part of the optical member 122.

The fixed mirror 123 and the movable mirror 124 have, in mirror surfaces 113a and 114a for reflecting light or an electromagnetic wave, a metal having high reflectivity such as aluminum, a high-reflectivity film including a dielectric multilayer film, or the like. The movable mirror 124 is attached to the curved part 128a of the Bourdon tube 128. The Bourdon tube 128 is an example of a support member that supports the movable mirror 124.

In a case where an amount of moisture in the object to be measured 100 is a reference value and the curved part 128a of the Bourdon tube 128 is not deformed, a mirror surface 124a of the movable mirror 124 and a mirror surface 123a of the fixed mirror 123 are orthogonal to each other. In this case, light or an electromagnetic wave emitted from the lighting device 2 is reflected in a retroreflection direction.

In a case where the amount of moisture in the object to be measured 100 changes from the reference value, the curved part 128a of the Bourdon tube 128 is deformed. In this case, the movable mirror 124 attached to the curved part 128a moves, and an angle formed between the mirror surface 124a of the movable mirror 124 and the mirror surface 123a of the fixed mirror 123 changes. Accordingly, a travelling direction of reflected light or a reflected electromagnetic wave is deviated from a retroreflection direction. Since a light distribution of reflected light or a reflected electromagnetic wave in the vicinity of the retroreflection direction changes in accordance with the amount of moisture of the object to be measured 100, the amount of moisture of the object to be measured 100 can be measured on the basis of this change.

Although the amount of moisture in soil can be measured by using the tensiometer 125, use of the visualizer 120 according to Third Embodiment makes it possible to measure the amount of moisture from a remote place without the need for a power source. For this reason, the visualizer 120 according to Third Embodiment is extremely useful for measurement of the amount of moisture in soil, for example, in an inconvenient place that is prone to sediment disasters.

Figure 18:
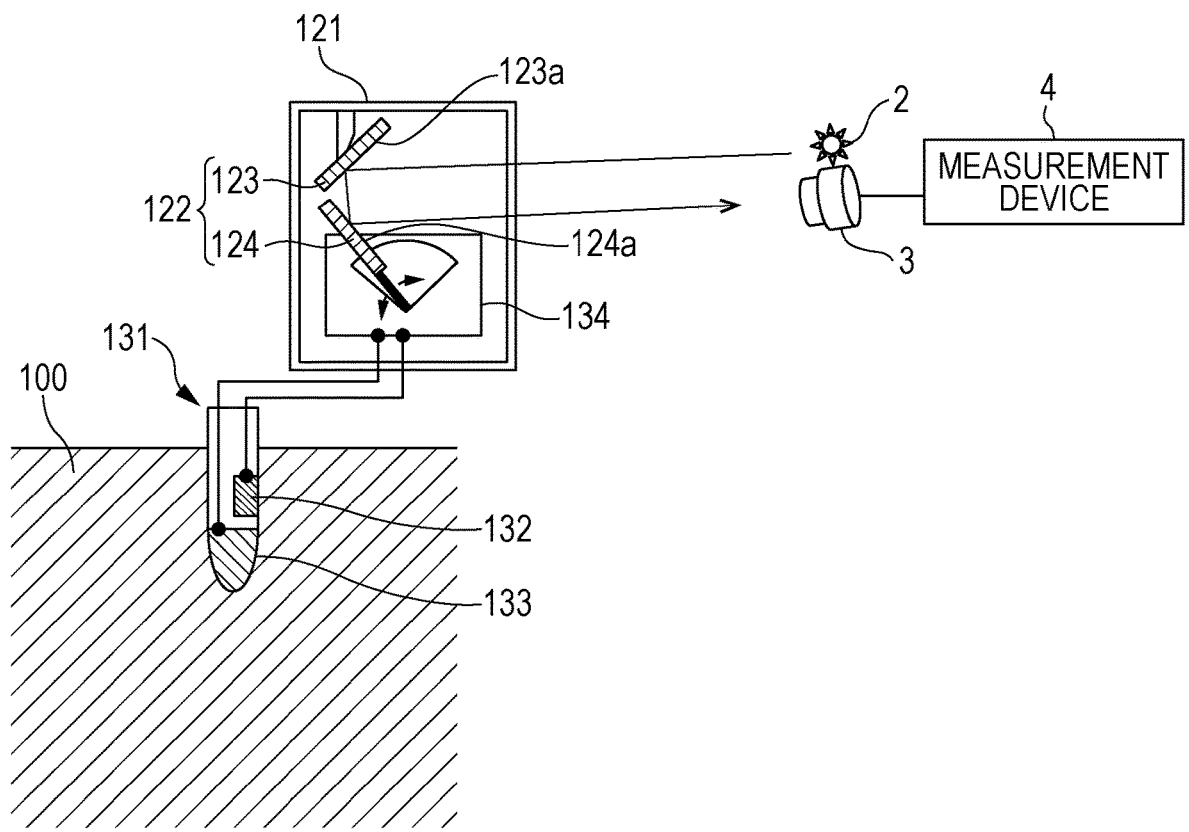
FIG. 18 is a cross-sectional view illustrating a modification of the state measurement system according to Third Embodiment of the present disclosure.

In Third Embodiment, the visualizer 120 is attached to the tensiometer 125 and measures an amount of moisture in soil. However, the present disclosure is not limited to this. For example, the visualizer 120 may be attached to a pH meter 131 and measures pH in soil, as illustrated in FIG. 18. The pH meter 131 is an example of a stress unit.

The pH meter 131 includes two kinds of metal electrodes 132 and 133 having different ionization tendencies and an analog meter 134. The metal electrodes 132 and 133 can be any combination of metals that generate electromotive force in water. The metal electrode 132 is, for example, zinc. The metal electrode 133 is, for example, silver or silver chloride. The movable mirror 124 is attached to the analog meter 134. The analog meter 134 is an example of a support member that supports the movable mirror 124.

In a case where an electric potential difference between the metal electrodes 132 and 133 is a reference value, the mirror surface 124a of the movable mirror 124 attached to the analog meter 134 and the mirror surface 123a of the fixed mirror 123 are orthogonal to each other. In this case, light or an electromagnetic wave emitted from the lighting device 2 is reflected in a retroreflection direction.

When the pH meter 131 is inserted into soil, the electric potential difference between the metal electrodes 132 and 133 changes from the reference value in accordance with pH of moisture in the soil. This electric potential difference serves as electromotive force that generates electromagnetic force or electrostatic force, and this electromagnetic force or electrostatic force moves the analog meter 134 and the movable mirror 124, thereby changing an angle formed between the mirror surface 124a of the movable mirror 124 and the mirror surface 123a of the fixed mirror 123. As a result, a travelling direction of reflected light or a reflected electromagnetic wave is deviated from the retroreflection direction. Since a light distribution of reflected light or a reflected electromagnetic wave in the vicinity of the retroreflection direction changes in accordance with the amount of moisture of the object to be measured 100, the amount of moisture of the object to be measured 100 can be measured on the basis of this change.

Although pH of moisture in soil can be measured by using the pH meter 131, use of the visualizer 120 according to Third Embodiment makes it possible to measure pH of moisture from a remote place without the need for a power source. For this reason, the visualizer 120 according to Third Embodiment is extremely useful for measurement of pH of moisture in soil in a wide range, for example, for an agricultural purpose or for the purpose of prevention of disasters.

The tensiometer 125 and the pH meter 131 have been described as examples of a stress unit that generates stress in accordance with the state of the object to be measured 100. However, the present disclosure is not limited to this. For example, the stress unit may be one (e.g., a barometer, a piezoelectric body, or a voice coil motor) that can generate stress upon occurrence of some sort of change of a state (e.g., atmospheric pressure, acceleration, or distortion) of the object to be measured 100 and move the movable mirror 124 by the stress. A similar effect can be obtained even in this case.

Fourth Embodiment

Figure 19B:
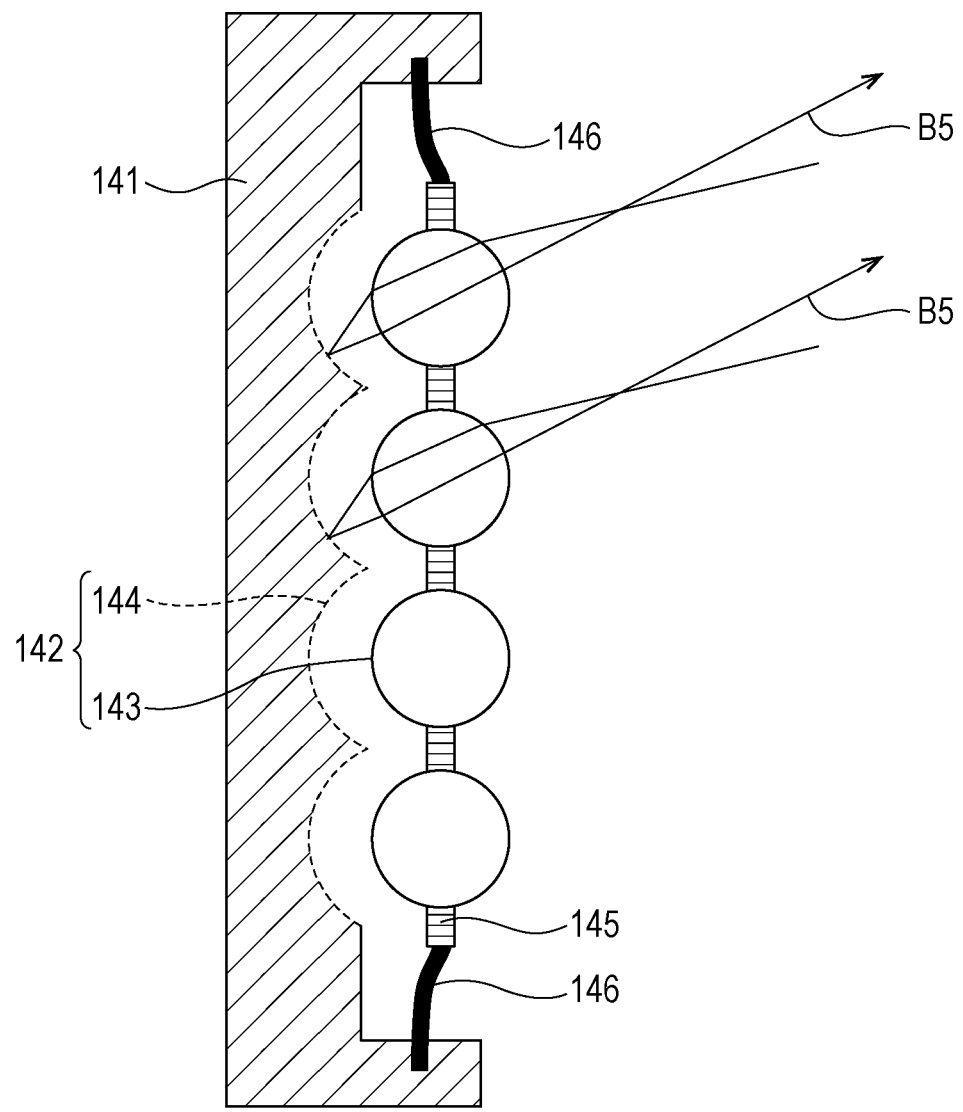
FIG. 19B is a cross-sectional view of the visualizer included in the measurement system according to Fourth Embodiment of the present disclosure and illustrates the visualizer in a case where the state of the object to be measured has changed.

FIGS. 19A and 19B illustrate an outline configuration of a visualizer included in a measurement system according to Fourth Embodiment of the present disclosure.

The measurement system according to Fourth Embodiment is different from the measurement system according to First Embodiment in that the measurement system according to Fourth Embodiment includes a visualizer 140 having a beaded structure instead of the visualizer 1. Fourth Embodiment is similar to First Embodiment except for this point.

The visualizer 140 utilizes deformation of a bimetal that occurs depending on temperature, humidity, or the like. The visualizer 140 performs measurement by changing a light distribution of reflected light or a reflected electromagnetic wave in the vicinity of a retroreflection direction in accordance with a change of a state of the object to be measured 100.

Specifically, the visualizer 140 includes a housing 141 and an optical member 142 having light or electromagnetic wave retroreflection characteristics, as illustrated in FIGS. 19A and 19B.

The optical member 142 includes a spherical lens 143 and a concave reflection member 144 that is disposed behind the spherical lens 143 (on a side far from the lighting device 2). The spherical lens 143 is movable independently of the concave reflection member 144. The concave reflection member 144 has a concave surface that is concentric with the surface of the spherical lens 143. That is, the concave reflection member 144 has a concave surface that is part of a spherical surface. The concave reflection member 144 serves as a mirror surface that reflects light or an electromagnetic wave. A relative positional relationship between the spherical lens 143 and the concave reflection member 144 changes in accordance with a change of a state of the object to be measured 100. The spherical lens 143 is an example of one part of the optical member 142, and the concave reflection member 144 is an example of another part of the optical member 142. A relative positional relationship between the object to be measured 100 and the concave reflection member 144 may be fixed or a relative positional relationship between the object to be measured 100 and the spherical lens 143 may be fixed.

The spherical lens 143 is embedded in a hole for position fixation that is provided in a plate member 145. The plate member 145 is attached to the housing 141 with a support member 146 interposed therebetween. The support member 146 includes a bimetal that deforms depending on temperature, humidity, an amount of moisture, a far-infrared ray, or radiation.

In a case where a state of the object to be measured 100 has not changed, the bimetal of the support member 146 is straight as illustrated in FIG. 19A. In this case, the concave reflection member 144 is located at a focal position of the spherical lens 143. Light or an electromagnetic wave reflected by the concave reflection member 144 travels in a retroreflection direction A1 through the spherical lens 143.

When the state of the object to be measured 100 changes, the bimetal of the support member 146 is curved as illustrated in FIG. 19B. In this case, the spherical lens 143 moves forward, and the concave reflection member 144 is deviated from the focal position of the spherical lens 143. Light or an electromagnetic wave reflected by the concave reflection member 144 travels in a reflection direction B5 deviated from the retroreflection direction A1 through the spherical lens 143. Since a light distribution of reflected light or a reflected electromagnetic wave in the vicinity of the retroreflection direction changes in accordance with a change of a state of the object to be measured 100, the state of the object to be measured 100 can be measured on the basis of this change.

In Fourth Embodiment, an example in which temperature, humidity, or the like is measured by using a bimetal has been described as in Second Embodiment. However, the present disclosure is not limited to this. For example, the support member 146 may be a string or a spring that supports the spherical lens 143 from above so that the spherical lens 143 keeps posture thereof irrespective of whether or not the housing 141 is tilted with respect to the horizontal plane as in the configuration described with reference to FIGS. 11A through 11C. According to this configuration, a tilt angle of the object to be measured 100 can be measured. It is also possible to employ a configuration in which the position of the spherical lens 143 is moved by a stress unit such as a tensiometer or a pH meter as in Third Embodiment. According to this configuration, it is possible to measure an amount of moisture of the object to be measured 100.

EXAMPLE

A visualizer according to Example has a similar configuration to the visualizer 1 according to First Embodiment. In the visualizer according to Example, an acrylic container was used as the housing 11. Water was used as the liquid 15. A plastic mirror obtained by vapor-depositing aluminum on a polyethylene plate having a thickness of 0.5 mm was used as the movable mirror 14. Specific gravity of the movable mirror 14 was adjusted by attaching a piece of aluminum onto a rear side thereof. When the specific gravity of the movable mirror 14 was adjusted so that more than a half of the movable mirror 14 sinks in the liquid 15, rocking of the movable mirror 14 was very small even when the housing 11 shakes.

As the reference mirror 13a and the bias mirror 13b, a mirror obtained by vapor-depositing an aluminum film having a thickness of 0.2 μm onto an acrylic linear prism sheet having an apex angle of 90 degrees, a prism pitch of 1 mm, and a thickness of 2 mm was used. The reference mirror 13a was attached to the housing 11 so that ridge lines of prisms were parallel with a side surface of the housing 11. The bias mirror 13b was attached to the housing 11 so that ridge lines of prisms were tilted by 1 degree and were spaced away forward by a larger amount as a distance to an upper side became shorter. A spacer was provided between an upper part of the bias mirror 13b and the housing 11.

The visualizer according to Example configured as above was placed on a tilt table whose tile can be fine-adjusted by a micrometer. In this state, the visualizer was irradiated with laser light from a position that is away by 10 m from the visualizer, reflected light reflected by the visualizer was projected on graph paper on a wall, and thus a travelling direction of the reflected light was measured.

In a case where the tilt angle of the tilt table was zero, the reflected light correctly returned to the position of a laser light source, i.e., exhibited perfect retroreflection characteristics. In a case where the tilt table was tilted forward or backward with respect to the laser light source (see FIGS. 4A through 4C), the travelling direction of the reflected light was deviated upward or downward by a deviation angle that is two times as large as the tilt angle. In a case where the tilt table was tilted leftward or rightward with respect to the light source (see FIGS. 6A through 7), the travelling direction of the reflected light was deviated leftward or rightward by a deviation angle that is two times as large as the tilt angle.

A compound-eye digital camera that was capable of taking a 3D image was used as the imaging device 3. A lighting device that includes LED lamps of three (RGB) colors aligned in three columns and three rows at 3 mm intervals was used as the lighting device 2. The lighting device 2 and the imaging device 3 were placed at a point that is obliquely upward by approximately 15 degrees and is away by 100 m from the visualizer. In this state, light was emitted from the lighting device 2 toward the visualizer, and reflected light was imaged by the imaging device 3. The intervals of 3 mm of the LED lamps correspond to 0.0017 degrees (approximately 6.2 seconds) at the point that is away by 100 m.

The visualizer was found as a small bright point in the image taken by the imaging device 3, and the luminance thereof fluctuated due to constant vibration. Therefore, an average during 5 seconds was calculated as a still state. The image was taken by the imaging device 3 while gradually changing the tilt angle of the tilt table. As a result, it was confirmed that the imaging device 3 imaged different LED light every time the tilt angle was changed by 0.00086 degrees that was ½ of 0.0017 degrees. It was thus confirmed that a tilt angle of an object to be measured can be measured.

A difference in luminance was also seen in an image taken by the compound-eye digital camera, and it was also confirmed that a tilt angle of an object to be measured can be measured in more detail by reducing a lens interval of compound-eye lenses. Furthermore, in a case where the tilt angle of the visualizer was vibrated so as to draw a sine waveform by using a vibrator, brightness of the visualizer in a taken image changed in accordance with the frequency of the vibration. It was thus confirmed that vibration of an object to be measured can also be measured.

In this way, it was confirmed that a state of an object to be measured can be measured from a remote place by attaching a visualizer according to the present disclosure to the object to be measured.

Effects of the above embodiments can be produced by appropriately combining any ones of the various embodiments described above.

The present disclosure has been fully described in association with some embodiments with reference to the attached drawings, but various changes and modifications are apparent for persons skilled in the art. It should be understood that such changes and modifications are encompassed within the scope of the present disclosure specified by the claims without departing from the scope of the present disclosure.

The present disclosure makes it possible to visualize a state of an object to be measured without the need for a power source and is therefore useful, for example, for evaluation and monitoring of a degree of soundness of not only a public structure such as a bridge or a tunnel, but also a machine or a building and management of a farm land. Furthermore, it is also possible to measure a state of a whole object to be measured from a plane or a satellite by using a large-sized visualizer. Therefore, the present disclosure is also applicable to monitoring of dangerous places, for example, sediment disasters.

What is claimed is:

1. A visualizer, comprising:
   an optical member including a fixed part that has a fixed relative positional relationship with an object to be measured and a movable part that is movably supported by the fixed part and keeps a constant angle with respect to a gravity direction, the optical member retroreflecting a light or an electromagnetic wave from outside of the visualizer to outside of the visualizer in a case where the fixed part and the movable part are in a predetermined positional relationship, wherein:
   the optical member changes an intensity of the light or the electromagnetic wave reflected in a retroreflection direction in accordance with a change of a relative positional relationship between the fixed part and the movable part,
   the optical member includes a liquid that is held by the fixed part, and
   the movable part is supported by the fixed part only through the liquid.

2. The visualizer according to claim 1, wherein:
   the optical member includes a first mirror having a first mirror surface, a second mirror having a second mirror surface, and a third mirror having a third mirror surface, the first mirror surface, the second mirror surface, and the third mirror surface intersecting and facing one another,
   the first mirror is included in the fixed part,
   the second mirror is included in the movable part and is supported by the fixed part through the liquid so that the second mirror surface keeps a constant angle with respect to the gravity direction, and
   the optical member changes the intensity of the light or the electromagnetic wave reflected in the retroreflection direction in accordance with a change of an angle formed between the first mirror surface and the second mirror surface.

3. The visualizer according to claim 1, wherein a specific gravity of the liquid is larger than a specific gravity of the movable part.

4. A measurement system, comprising:
   one or more visualizers according to claim 1;
   a lighting device that emits a light or an electromagnetic wave toward the one or more visualizers mounted on an object to be measured;
   an imaging device that takes an image including the object to be measured and the one or more visualizers; and
   a measurement device that measures a change of a relative positional relationship between the fixed part and the movable part in the one or more visualizers on a basis of a change of an intensity of reflected light or a reflected electromagnetic wave from the one or more visualizers in the image.

5. The measurement system according to claim 4, wherein the imaging device includes a plurality of cameras or a compound-eye camera; and
   the measurement device detects a light distribution of the reflected light or the reflected electromagnetic wave on a basis of a plurality of images taken by the plurality of cameras or the compound-eye camera.

6. The measurement system according to claim 4, wherein the lighting device includes a plurality of light sources; and
   the plurality of light sources emit light beams or electromagnetic waves that are different from one another in terms of at least one of a wavelength, a polarization state, and an irradiation timing.

7. A measurement method comprising:
   emitting light or an electromagnetic wave to one or more visualizers according to claim 1 attached to an object to be measured;
   taking an image including a reflected light or a reflected electromagnetic wave from the one or more visualizers; and
   measuring a state of the object to be measured on a basis of the image.

8. The visualizer according to claim 1, wherein the movable part floats on the liquid.

9. The visualizer according to claim 1, further comprising a housing holding the liquid,
   wherein the fixed part is fixed to and disposed in the housing.

10. The visualizer according to claim 1, wherein the fixed part includes a reference mirror and a bias mirror that is disposed so as to be tilted forward with respect to the reference mirror.

11. The visualizer according to claim 10, wherein each of the reference mirror and the bias mirror each has a linear prism shape.

12. The visualizer according to claim 1, wherein the movable part has a triangular prism shape.

* * * * *